US 6,665,771 B1

(12) United States Patent
Michel et al.

(10) Patent No.: US 6,665,771 B1
(45) Date of Patent: *Dec. 16, 2003

(54) INTRA-DISK SWAPPING OF DATA STORAGE VOLUMES

(75) Inventors: Ruben Michel, Hopkinton, MA (US); Tao Kai Lam, Boston, MA (US); David W. DesRoches, Methuen, MA (US); Victoria Dubrovsky, Westboro, MA (US); Eitan Bachmat, Lehavim (IL)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,826

(22) Filed: Mar. 31, 2000

(51) Int. Cl.[7] .............................................. G06F 12/02
(52) U.S. Cl. .............................. 711/112; 711/4; 711/114; 711/154; 711/167; 709/105; 710/18; 714/6; 714/7
(58) Field of Search ................................. 711/112, 154, 711/167, 114, 4; 709/105; 710/18; 714/6, 7

(56) References Cited

U.S. PATENT DOCUMENTS

| | | | | | |
|---|---|---|---|---|---|
| 4,638,424 | A | * | 1/1987 | Beglin et al. ............... 711/112 |
| 6,061,761 | A | * | 5/2000 | Bachmat ..................... 709/105 |
| 6,088,766 | A | * | 7/2000 | Bachmat et al. ............ 711/114 |
| 6,189,071 | B1 | * | 2/2001 | Bachmat ..................... 711/114 |
| 6,237,063 | B1 | * | 5/2001 | Bachmat et al. ............ 711/114 |
| 6,341,333 | B1 | * | 1/2002 | Schreiber et al. ........... 711/114 |
| 6,405,282 | B1 | * | 6/2002 | Lam et al. .................. 711/105 |
| 6,415,372 | B1 | * | 7/2002 | Zakai et al. ................ 711/165 |
| 6,442,650 | B1 | * | 8/2002 | Bachmat et al. ............ 709/105 |

OTHER PUBLICATIONS

Thornock et al., "A Stochastic Disk I/O Simultation Technique," pp 1079–1086, ACM, 1997.*

* cited by examiner

Primary Examiner—Matthew Kim
Assistant Examiner—Stephen Elmore
(74) Attorney, Agent, or Firm—John M. Gunther; Penelope S. Wilson

(57) ABSTRACT

A process performs an intra-disk swap. The process includes finding a set of values indicative of access loads of new states of a disk. Each new state is produced from a current state of the disk by hypothetically swapping a pair of physical storage volumes of the disk. The process also includes performing the swap of a pair of physical storage volumes based on the value of the access load of the new state produced by hypothetically swapping the pair.

32 Claims, 17 Drawing Sheets

US 6,665,771 B1

INTRA-DISK SWAPPING OF DATA STORAGE VOLUMES

TECHNICAL FIELD

This invention relates to data storage systems.

BACKGROUND

An access to a data storage disk proceeds via a sequence of acts that additively contribute to the time needed to complete the access. The sequence includes acts that physically align a disk's read-write head with the physical storage volume being accessed and acts that actually transfer data to or from the physically aligned storage volume.

The physical alignment typically involves two movements. One movement is a radial travel of the read-write head that aligns the head with a start track of the storage volume to be accessed. The average time for the head travel is referred to as the seek time. The other movement is a rotation of the disk that aligns the read-write head with a start sector of the storage volume to be accessed. The average time for the disk rotational movement is referred to as the rotational latency time.

The total access time for a storage disk is the total time needed to complete the acts of the access. Thus, the total access time is a sum of the seek time, the rotational latency time, and the actual time to transfer data. The seek time can however, provide the dominant contribution to the total access time for many storage disks. Each contribution to the total access time is dynamical and can depend on the state of both the disk and the applications using the disk.

The dynamical nature of the contributions to the total access time is illustrated by the seek time. The seek time depends on access patterns for individual storage volumes of the disk. If the access pattern includes many consecutive accesses to the same physical storage volume, the seek time will be small. If the access pattern includes many consecutive accesses to new physical storage volumes, the seek time will be large. Determining the seek time usually requires measurements of access activity data for the physical storage volumes of the disk.

SUMMARY

In a first aspect, the invention features a process for performing an intra-disk swap. The process includes finding a set of values indicative of access loads of new states of a disk. Each new state is produced from a current state of the disk by hypothetically swapping a pair of physical storage volumes of the disk. The process also includes swapping a pair of physical storage volumes based on the value of the access load of the new state produced by hypothetically swapping the pair.

In some embodiments, each value of the access load is either a seek time or a total access time. The act of swapping may be responsive to the swap of the associated pair of volumes producing the new state with the lowest value of the set.

In some embodiments, each value of the access time is either a seek time or a reduction to a seek time of the current state. The act of finding may perform a number of arithmetic operations to obtain the set of values, the number being of order of a number of values in the set.

The act of finding may also include finding a set of numerical objects from activity data for the current state and determining the seek time or reduction to seek time for each new state by evaluating a formula based on the found set of numerical objects. The set has of order N members with N being the number of storage volumes. The formula has less than of order N terms.

In these embodiments, the act of finding a set of numerical objects may include evaluating a set of equations $\{R_{j+1} = (R_j + a_j) t^{Ref}_{p+1,p}\}$ for components of a vector object R. The "$t^{Ref}_{p+1,p}$" is a number, and each $a_j$ is an activity of the storage volume with index "j" in the current state. Each act of determining may include evaluating $[-(a_p - a_q)[R_p + R_p^* - R_q - R_q^*] + (a_p - a_q)^2 (t^{Ref}_{pp} + t^{Ref}_{qq} - 2t^{Ref}_{pq})]/F$ with F being the total activity of the current state.

In some embodiments, each act of finding a value includes performing a sum over component seek times to obtain a seek time for an associated new state. Each component seek time is a seek time associated with a reference head travel time function. For storage disks one form for the head travel time function is given by:

$t_{kj} = x_j$, for $j = k$, and $t_{kj} = \alpha^{|j-k|}$ for $j \neq k$.

For a selected value of $\alpha$, this form is referred to as a reference travel time function, $t_{kj}^{Ref}$. The number $\alpha$ defines the particular reference travel time function, $t_{kj}^{Ref}$, and may be a real or a complex number. For $\alpha = 1$, the associated reference travel time function is independent of distance between the storage volumes "j" and "k". For a set of values of $\alpha$, the reference travel time functions, $t_{kj}^{Ref}(n)$, can provide a series approximation to other head travel functions. Each term of each sum may be weighted by expansion coefficients of a head travel time function of the disk with respect to the reference travel time functions.

In a second aspect, the invention features a process for determining seek times. The process includes collecting activity data on a current state of a disk, finding a plurality of numerical objects from the activity data, and then, determining a plurality of seek times for new states from the found numerical objects. Each new state is related to the current state by a hypothetical swap of a pair of storage volumes of the disk. The seek times correspond to a preselected reference head travel time function.

In some embodiments, each act of determining a seek time includes performing a set of simple arithmetic operations less numerous than the physical storage volumes of the disk.

In some embodiments, the act of finding a plurality of numerical objects includes performing a set of simple arithmetic operations whose number is smaller than a square of the number of physical storage volumes on the disk.

In some embodiments, the reference head travel time function between a pair of the storage volumes is a weighted sum of numbers to powers of a distance between the pair of storage volumes.

In some embodiments, the act of finding a plurality of numerical objects includes evaluating a set of equations $\{R_{j+1} = (R_j + a_j) t^{Ref}_{p+1,p}\}$ for a vector object R. Here, the "$t^{Ref}_{p+1,p}$" is a number, and each $a_j$ is an activity of the storage volume with index "j" in the current state. The act of determining the seek time of the new state produced by hypothetically swapping may also include evaluating $[-(a_p - a_q)[R_p + R_p^* - R_q - R_q^*] + (a_p - a_q)^2 (t^{Ref}_{pp} + t^{Ref}_{qq} - 2t^{Ref}_{pq})]/F$ with F being a total activity of the current state.

In a third aspect, the invention features a program storage media storing a computer executable program of instructions. The instructions cause a computer to perform one of the above-described processes.

In a fourth aspect, the invention features a system for performing an intra-disk swap. The system includes means for finding a set of values indicative of access loads of new states of a disk. Each new state is produced from a current state of the disk by hypothetically swapping a pair of physical storage volumes of the disk.

In some embodiments, the system further includes means for swapping one of the pairs of physical storage volumes based on the value of the access load of the new state produced by hypothetically swapping the one of the pairs. The access load may be a seek time or a total access time.

In some embodiments, the means for finding performs a number of arithmetic operations to obtain the set of values. The number is of order of the number of values in the set.

Other features and advantages of the invention will be apparent from the detailed description and claims.

DETAILED DESCRIPTION

This application incorporates U.S. patent application Ser No. 09/442,884, filed Nov. 18, 1999, and issued as U.S. Pat. No. 6,415,372 on Jul. 2, 2002, by reference in its entirety.

This application incorporates U.S. patent application Ser No. 09/396,146 filed Sep. 15, 1999, and issued as U.S. Pat. No. 6,480,930 on Nov. 12, 2002; U.S. patent application Ser. No. 09/396,253 filed Sep. 15, 1999 by Eitan Bachmat et al.; "Load Balancing on Disk Array Storage Device," filed Sep. 15, 1999 by Eitan Bachmat et al. and issued as U.S. Patent No.; U.S. patent application Ser. No. 09/396,218, "Method for the Transparent Exchange of Logical Volumes in a Disk Array," filed Sep. 15, 1999 by Musik Schreiber et al. and issued as U.S. Pat. No. 6,341,333 on Jan. 22, 2002; U.S. patent application Ser. No. 09/396,275, "Maximizing Sequential Output in a Disk Array Storage Device," filed Sep. 15, 1999 by Eitan Bachmat et al. and issued as U.S. Pat. No. 6,442,650 on Aug. 27, 2002; and U.S. patent application Ser. No. 09/396,217, "Method for Analyzing Disk Seek Times in a Disk Array Storage Device," filed Sep. 15, 1999 by Tao Kai Lam et al. and issued as U.S. Pat. No. 6,405,282 on Jun. 11, 2002; by reference in their entirety.

Figure 1:
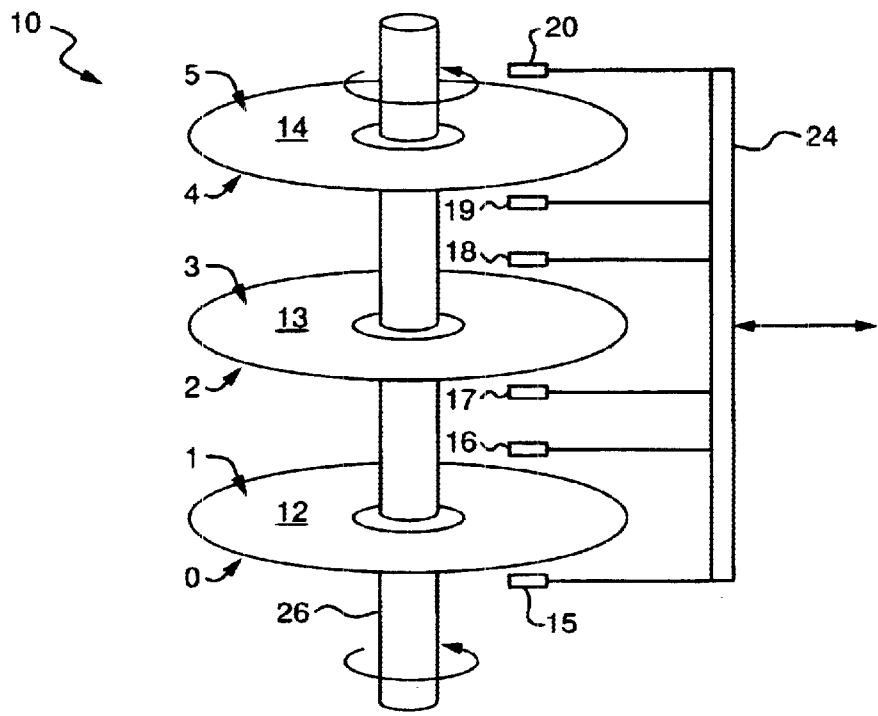
FIG. 1 shows a high-capacity data storage device.

FIG. 1 is a side view of a high-capacity data storage device 10. The high-capacity data storage device 10 has a stack of physical storage disks or plattens 12–14. Each physical storage disk 12–14 has one read-write head 15–20 per storage surface 0–5. The read-write heads 15–20 rigidly attach to an arm 24, which moves the heads 15–20 toward or away from an axis 26 of the physical storage disks 12–14. The axis 26 can rotate the stack of physical disks 12–14 in the indicated sense.

Figure 2:
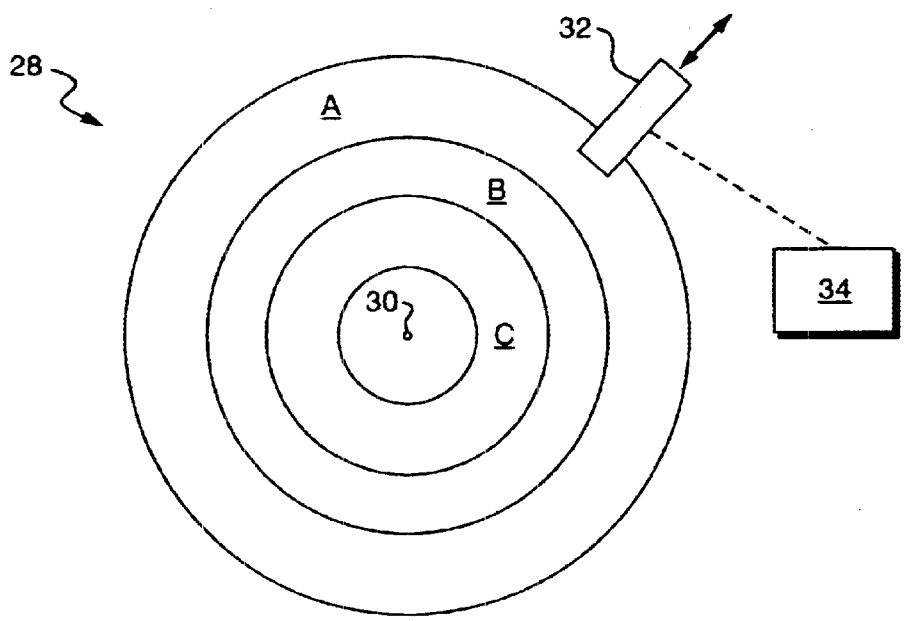
FIG. 2 is a top view of one storage surface of the data storage device of FIG. 1.

FIG. 2 is a top view of a data storage surface 28 of one of the physical storage disks 12–14 shown in FIG. 1. The storage surface 28 has multiple physical storage volumes A–C. Each physical storage volume A–C is a region defined by a range of radial distances, i.e., tracks, with respect to a rotational axis 30. The various storage volumes A–C may have different sizes.

To access one of the physical storage volumes A–C, a read-write head 32 for the surface 28 is physically aligned over the volume A–C being accessed. The alignment involves radial travel of read-write head 32, e.g., under control of the arm 24 of FIG. 1, and rotation of the storage surface 28 about the rotational axis 30. The radial and rotational movements align the read-write head 32 with starting track 15 and starting angular sector, respectively, for the physical storage volume A–C being accessed.

Accesses to the read-write head 32 are monitored by an external system 34, which collects data on activities "$a_A$–$a_C$" of the individual storage volumes A–C. The activities $\{a_j\}$ are weighted averages of numbers of reads from, writes to, and sequential prefetches from the associated physical storage volumes "j" during time periods of preselected length. In various embodiments, the weights in the average defining the activities "$a_A$ to $a_C$" differ. By using the activities "$a_A$–$a_C$" of the physical storage volumes A–C of the storage surface 28, the seek time "S" of read-write head 32 of the surface 28 can be determined.

Similarly, transfer times can be determined by monitoring amounts of data transferred in accesses.

Herein, a physical storage volume, j, refers to a physically connected portion of a storage device for which activity data, $a_j$, is separately collected. One physical storage volume may include one logical volume, several, or a portion of a logical volume of the storage device.

Seek times, rotational latency times, and transfer times provide useful performance measures for a physical storage disk. These times may be compared to standards to obtain a measure of the disk's performance. These times may also be used as a measure for determining how to accommodate heavy access loads. For example, data may be moved to volumes or disks for which these times are lower, and/or access queue depths may be lengthened in response to these times being high. If one of the seek time, rotational latency time, and transfer time becomes long, total access times become long and applications using the disk may run slowly.

SEEK TIMES

Wong has provided a formula for calculating the seek time, S, of a physical storage disk. Wong's formula is described in Algorithmic Studies of Mass Storage Systems, by C. K. Wong (Computer Science Press, 1983). For a physical storage disk having "N" physical storage volumes, Wong's formula is:

$$S = \sum_{k,j=1,\ldots N} a_k a_j t_{kj} \left[ \sum_{r=1,\ldots N} a_r \right]^{-1}$$

Here $t_{kj}$ is the travel time function of the access head, e.g., a read-write head, between the storage volumes "k" and "j." Wong assumes that $t_{kj}=d_{kj}$ with $d_{kj}$ being the distance between volumes "k" and "j," e.g. $d_{kj}$ is proportional to $|k-j|$ for disks with equal size storage volumes.

In Wong's formula, each sum runs over the "N" physical storage volumes of the physical storage disk that the access head serves. For a disk with N physical storage volumes, a straightforward calculation of the seek time, S, involves of order $N^2$ simple arithmetic operations.

Herein, simple arithmetic operations are additions, subtractions, multiplications, and divisions of two numbers. The order of a set of simple arithmetic operations provides a range-type evaluation of the number of operations. Order N refers to ranges of numbers defined by QN where the constant Q is much smaller than $N^2$ and much larger than $N^{-1}$. Similarly, order 1 and order $N^2$ refer to ranges of numbers defined by Q and $QN^2$, respectively.

Often, for a computer program segment, the order of the number of simple arithmetic operations executed can be determined from the numbers of nested loops in the program segment. A program segment with zero, one and two nested loops has of order 1, N, and $N^2$ operations, respectively, if the inner loop of the program segment has a fixed number of operations and each loop is performed approximately N times. For example, a naive and direct evaluation of $$\sum_{k,j=1,\ldots N} a_k a_j t_{kj}$$

involves of order $N^2$ simple arithmetic operations due to the double sum, i.e. two loops the actual number of simple arithmetic operations is about $3N^2$, because both additions and multiplications are involved, i.e. $3N^2$ is of order $N^2$.

Seek times can be used to monitor disk performance and to control data swaps used to balance access burdens of different storage devices. But, performing $N^2$ simple arithmetic operations to obtain a seek time is burdensome for some of these applications and may limit the uses of seek times. The burden associated with calculating seek times becomes more important as technology produces larger storage disks, which support more physical storage volumes.

The evaluation of seek times is based on a form of an access head's travel time function. For different types of data storage devices, the head travel time function, $t_{kj}$, between storage volumes "k" and "j" has different forms.

For successive accesses to the same and to different physical volumes, the head travel time functions generally differ. One form for the head travel time function that allows for differences is given by:

$$t_{kj}=x_j, \text{ for } j=k, \text{ and } t_{kj}=x_0, \text{ for } j \neq k.$$

Here, the $x_j$'s and the $x_0$ are constants. For successive accesses to different storage volumes "k" and "j", the head travel time can also depend on the distance between the volumes, i.e., be proportional to $|k-j|$.

Some forms for the head travel time function allow for dependence on distances between successively accessed storage volumes. If constant movement dominates head travel, the head travel time function can often be described by the form:

$$t_{kj}=x_j, \text{ for } j=k, \text{ and } t_{kj}=K|j-k|, \text{ for } j \neq k.$$

Here, "K" is a constant. This form provides a description of head travel in magnetic tape storage devices. In such devices, a large component of the head travel involves winding or unwinding a length of magnetic tape at a relatively constant speed.

In storage disks, hesitation and acceleration are also important components of head travel. These motions make head travel times between storage volumes "j" and "k" more complicated functions of the distance, i.e., complicated functions of $|j-k|$. For storage disks one form for the head travel time function is given by:

$$t_{kj}=x_j, \text{ for } j=k, \text{ and } t_{kj}=\alpha^{|j-k|} \text{ for } j \neq k.$$

Henceforth, for a selected value of $\alpha$, this form is referred to as a reference travel time function, $t_{kj}^{Ref}$. The number $\alpha$ defines the particular reference travel time function, $t_{kj}^{Ref}$, and may be a real or a complex number. For $\alpha=1$, the associated reference travel time function is independent of distance between the storage volumes "j" and "k". For a set of values of $\alpha$, the reference travel time functions, $t_{kj}^{Ref}(n)$, can provide a series approximation to other head travel functions. Using a series often provides better approximations to the travel times of real access heads.

One series approximation uses two or three real values for $\alpha$. For the two-term approximation, the head travel time function has the form:

$$t_{kj}=x_j, \text{ for } j=k, \text{ and } t_{kj}=d_0+d_\alpha \alpha^{|j-k|} \text{ for } j \neq k.$$

The value of the number $\alpha$ is set empirically, and the constants $d_0$ and $d_\alpha$ are found through a least squares optimization process. The least squares optimization process minimizes the average square error between the actual head travel time function and the series approximation to the head travel time function. The number of terms in the series may be increased to better fit the actual head travel time function. For example, the series may also use several $\alpha$'s having different values at the expense of heavier computational effort.

Another series expansion uses a set of complex values of $\alpha$ to approximate to the head travel time function. This series expansion provides a discrete Fourier series approximation. Discrete Fourier series are known to persons of skill in the art.

For some forms of the head travel time functions, $t_{kj}$, fewer operations are needed to calculate a seek time. For lie head travel time functions $t_{kj}$ having the form $K|k-j|$, Wong has shown that a seek time can be found by performing substantially less than $N^2$ simple arithmetic operations, i.e., of order N such operations. As was mentioned above, the form $K|k-j|$ provides a good approximation to head travel time functions for magnetic tapes where travel time functions are distances to wind or unwind a portion of the tape. The same form does not, however, well approximate head travel time functions of many storage disks where hesitation and acceleration form important portions of the head travel. In storage disks, travel time functions represent distances to move a head between different radial tracks.

Even for storage disks, the head travel time function, $t_{kj}$, is still a "real" function depending on the distance between pairs of physical storage volumes "k" and "j", i.e., a function of $|k-j|$. Functions of $|k-j|$ can be expanded in a discrete Fourier series. For the head travel time function, $t_{kj}$, the discrete Fourier series takes the form:

$$t_{kj} = d_0 + \sum_{n=\pm 1, \pm 2, \ldots [N-1]/2} d_n \exp\{i2\pi n|k-j|/N\} \text{ with } d_{-n} = d_{+n}^*.$$

The smoothness of the dependence of the head travel time function on distance or $|k-j|$ implies that the discrete Fourier series will rapidly converge to $t_{kj}$. Often, the lowest terms provide a good approximation to $t_{kj}$. Thus, for many physical storage disks, a good approximation to the head travel time function is given by:

$$t_{kj}^{approx} = d_0 + d_{+1} \exp\{+i2\pi|k-j|/N\} + d_{+1}^* \exp\{-i2\pi n|k-j|/N\}.$$

For other physical storage disks, a few terms in the discrete Fourier series for the head travel time function provide a good approximation to the actual head travel time function.

FAST EVALUATION OF SEEK TIMES

For special forms of head travel time function, $t_{kj}$, Wong's formula may be evaluated faster by a process that entails substantially fewer simple arithmetic operations, i.e., less than of order $N^2$ simple arithmetic operations. The special forms include "reference" travel time functions, $t_{kj}^{Ref}$, which have the form:

$$t_{kj} = x_j \text{ for } k=j \text{ and } t_{kj} = \alpha^{|j-k|} \text{ for } k \neq j.$$

Here, $|k-j|$ is proportional to the distance between physical storage volumes "k" and "j". Both the number $\alpha$ and the $x_j$'s are independent of $|k-j|$. Reference travel time functions of the form $\exp\{\pm i2\pi n|k-j|/N\}$ form a basis set for a discrete Fourier expansion of a head travel time function. Since the head travel time function is real, the expansion includes $\exp\{\pm i2\pi n|k-j|/N\}$'s with both signs in the exponent. For real head travel time functions, the set $\{1, \alpha(1)|j-k|, \alpha(2)|j-k|\}$ in which $\alpha(1)$ and $\alpha(2)$ are real numbers forms another basis set of reference travel time functions.

Figure 3:
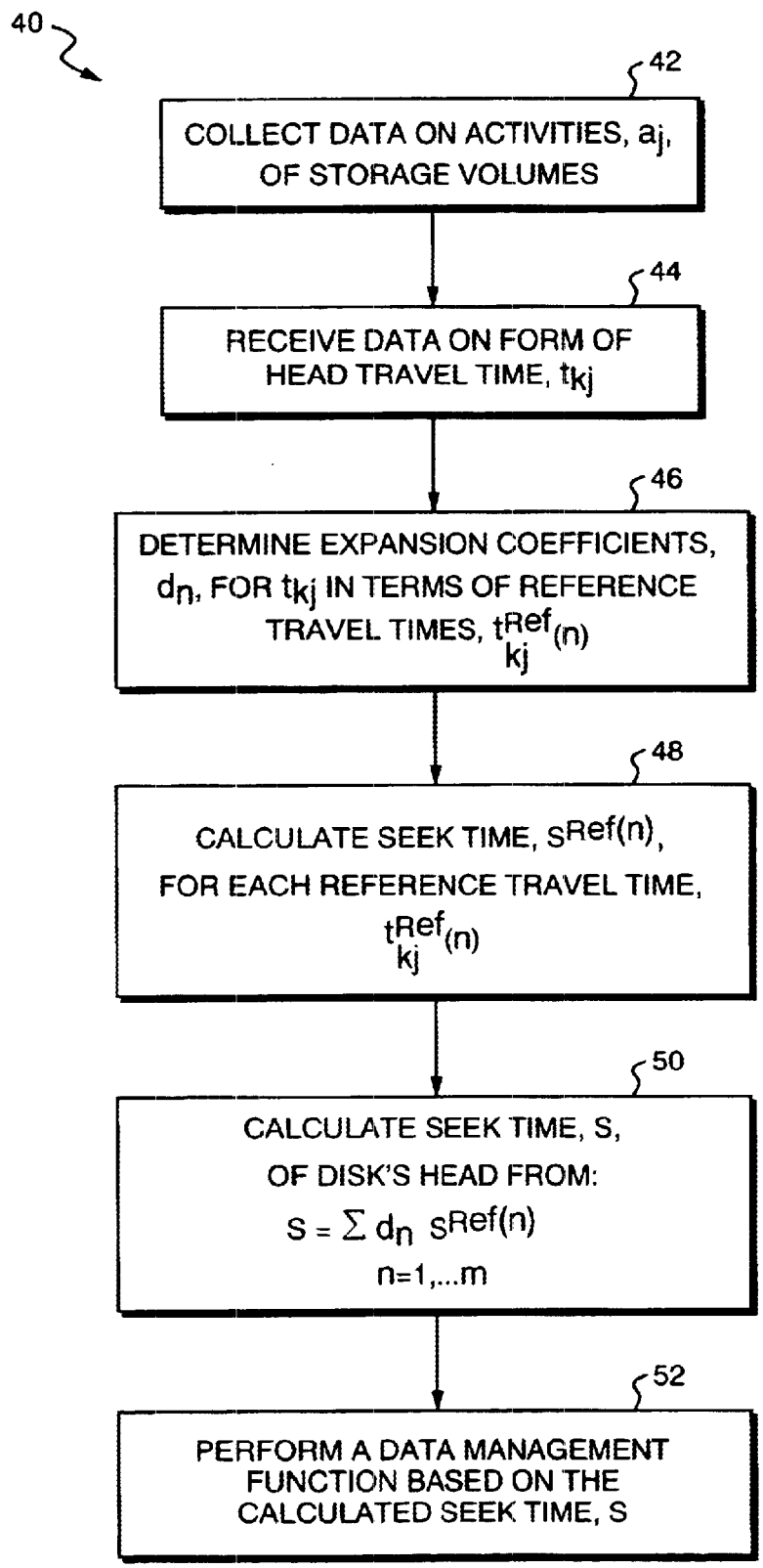
FIG. 3 is a flow chart showing a process for calculating a seek time of a physical disk.

FIG. 3 is a flow chart for a process 40 that calculates seek times of physical storage disks. The process 40 collects data on the activities, $a_j$, of each physical storage volume, j, of the disk during a collection period (step 42). The process 40 receives measurements or external data that provides the form of the disk's real head travel time function, $t_{kj}$ (step 44). The process 40 determines a set of coefficients, $d_n$, of an approximate expansion of the real head travel time function, $t_{kj}$, in terms of a set of "m" reference travel time functions, $t_{kj}^{Ref}(n)$ (step 46). The approximate expansion has the form:

$$t_{kj} = \sum_{n=1,\ldots,m} d_n t_{kj}^{Ref}(n)$$

If the reference travel time functions are low modes in a discrete Fourier basis, the coefficients, $d_n$, are determined by known processes for discrete Fourier series. If the reference travel time functions are the set $\{1, \alpha(1)|j-k|, \alpha(2)|j-k|\}$ with $\alpha(1)$ and $\alpha(2)$ real numbers, the coefficients, $d_n$, can be determined by an optimization process, e.g., least squares optimization.

For each reference travel time function, $t_{kj}^{Ref}(n)$, the process 40 calculates a seek time, $S^{Ref}(n)$, using Wong's formula (step 48). The process 40 calculates a portion of each seek time, $S^{Ref}(n)$, using a recursive technique that reduces the number of simple arithmetic operations needed from order $N^2$ to order N.

From the seek times, $S^{Ref}(n)$, of the reference travel time functions, $t_{kj}^{Ref}(n)$, the process 40 calculates the seek time, S, for the disk's real access head by linear superposition (step 50). The weights of the superposition are the expansion coefficients, $d_n$, for the disk head's travel time function, $t_{kj}$, in terms of the reference travel time functions, $t_{kj}^{Ref}(n)$. The seek time, S, of the actual access head takes the form:

$$S = \sum_{n=1,\ldots,m} d_n S^{Ref}(n).$$

The head seek time, S, is a sum over seek times, $S^{Ref}(n)$, corresponding to reference travel time functions, because Wong's formula is linear in the head travel time function.

The process 40 uses the calculated seek time, S, to perform a data management function (step 52). The data management function may provide performance data on the associated storage disk, adjust a length of a data access queue, and/or swap data between different physical storage volumes. The data management functions may also depend on information other than seek times, for example, rotational latency times, priorities, and transfer times.

Figure 4:
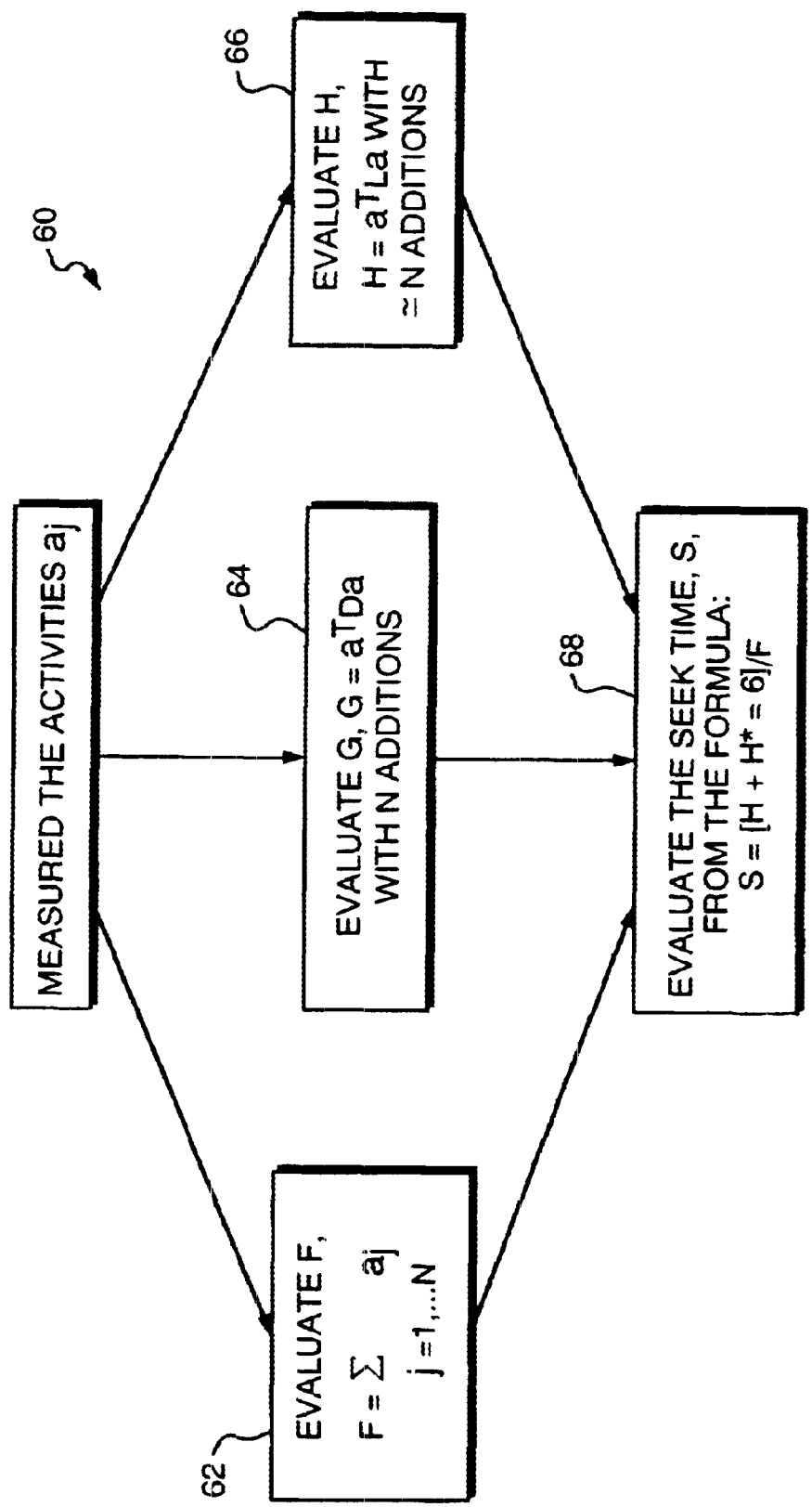
FIG. 4 is a flow chart showing a process for calculating a seek time associated with a reference head travel time function.

FIG. 4 is a flow chart for a process 60 that evaluates seek times, $S^{Ref}(n)$'s of the reference travel time functions, $t_{kj}^{Ref}(n)$. The process 60 uses a matrix decomposition of the travel time function matrix T. In matrix form, a travel time function matrix T and an activity column vector a have components:

$$T_{kj} = t_{kj} \text{ and } a_j = a_j \text{ with } k, j = 1, \ldots, N.$$

In terms of T and a, Wong's formula takes the form:

$$S = a^T T a \bigg/ \sum_{j=1,\ldots N} a_j.$$

The matrix form of Wong's formula can be split into several pieces based on properties of matrices.

To evaluate Wong's formula, the matrix T is written as a sum of upper triangular matrix U, diagonal matrix D, and lower triangular matrix L as follows:

$$T = U + D + L.$$

Using this decomposition of T, Wong's equation becomes:

$$S = a^T(U + D + L)a \bigg/ \sum_{j=1,\ldots N} a_j$$

$$= [a^T U a + a^T D a + a^T L a] \bigg/ \sum_{j=1,\ldots N} a_j$$

$$= [a^T(L + L^*)a + a^T D a] \bigg/ \sum_{j=1,\ldots N} a_j.$$

The last equality follows, because T is a Hermitian matrix, i.e., $T = T^\dagger$, and the activity vector a is real. The matrix T is a symmetric matrix for real head travel time functions.

The seek time, S, is a function of the matrix products $H=a^T L a$, $G=a^T D a$, and $$F = \sum_{j=1,\ldots N} a_j.$$

From collected activity data, the process 60 evaluates the products F and G directly as sums of N terms (steps 62, 64). As sums the products F and G have the forms:

$$F = \sum_{j=1,\ldots N} a_j \text{ and } G = \sum_{j=1,\ldots N} x_j a_j a_j.$$

Both F and G have N terms, because they involve single sums over the set of physical storage volumes. On the other hand, the product H involves a double sum having $N(N-1)/2$ terms, i.e., order $N^2$ terms. To reduce the number of simple arithmetic operations needed to evaluate this term, the process 60 evaluates H by a recursive procedure, which entails only of order N simple arithmetic operations (step 66). The recursive procedure relies on the special form of the reference travel time functions, $t_{kj}^{Ref}(n)$. The evaluations of F, G, and H may be performed in parallel.

From the calculations of F, G, and H, the process 60 evaluates the formula:

$$S^{Ref}=[H+H^*+G]/F$$

to determine the seek time, $S^{Ref}$, associated with a reference travel time function $t_{kj}^{Ref}(n)$ (step 68). The entire process 60 to find, S, involves of order N simple arithmetic operations, because the individual evaluations of F, G, and H involved of order N simple arithmetic operations for reference travel time functions, $t_{kj}^{Ref}(n)$.

For reference travel time functions, $t_{kj}^{Ref}(n)$, the quantity H involves a lower diagonal matrix L having a special form. The matrix L has the form:

$$L = \begin{bmatrix} 0, \ldots \\ \alpha, 0, \ldots \\ \alpha^2, \alpha, 0, \ldots \\ \alpha^3, \alpha^2, \alpha, 0, \\ \ldots \\ \alpha^{N-1}, \alpha^{N-2}, \ldots, \alpha, 0, \ldots \end{bmatrix}.$$

The matrix L and the activity vector a define a second vector object R by:

$R=La$ or $$\begin{bmatrix} R_1 \\ R_2 \\ R_3 \\ R_4 \\ \ldots \\ R_N \end{bmatrix} = \begin{bmatrix} 0 \\ \alpha a_1 \\ \alpha^2 a_1 + \alpha a_2 \\ \alpha^3 a_1 + \alpha^2 a_2 + \alpha a_3 \\ \ldots \\ \alpha^{N-1} a_1 + \alpha^{N-2} a_2 + \ldots + \alpha a_{N-1} \end{bmatrix}.$$

The components of this equation provide a set of recursive equations in which $R_{j-1}$ defines $R_j$ for each component "j" of the vector equation. The recursive equations are:

$R_1 = 0,$ $R_2 = \alpha(R_1 + a_1),$ $R_3 = \alpha(R_2 + a_2),$ $\vdots$ $R_N = \alpha(R_{N-1} + a_{N-1}).$ From the recursive equations, the whole set of $R_j$'s can be determined by performing of order N simple arithmetic operations.

Figure 5:
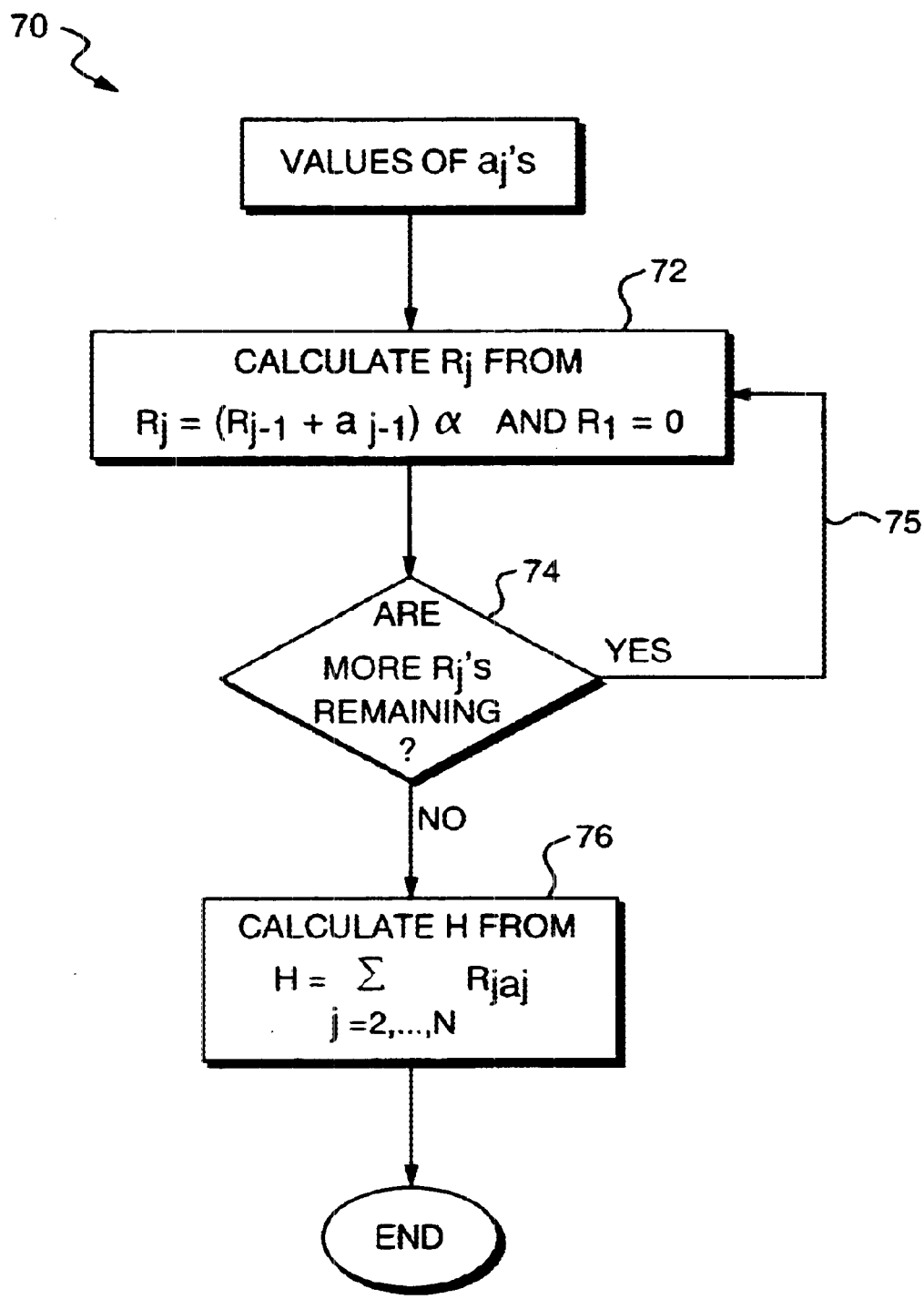
FIG. 5 is a flow chart for a process that evaluates one contribution to the seek time of FIG. 4.

FIG. 5 is a flow chart for a process 70 that evaluates the product H for a reference travel time function, $t_{kj}^{Ref}$, from the recursive equations for the $R_j$. Using the values of the activities $a_j$, the process 70 calculates the value of the lowest uncalculated $R_j$ from the previously calculated value of the next lower $R_{j-1}$ and $a_{j-1}$ (step 72). The recursive calculation is based on the set of formulas:

$R_j = (R_{j-1} + a_{j-1})\alpha$ for $j \geq 2$.

The lowest equation for the set of formulas is based on $R_1 = 0$. After evaluating an $R_j$, the process 70 determines if there is an $R_{j+1}$ remaining to calculate (step 74). If an $R_{j+1}$ remains, the process 70 loops back 75 to calculate the $R_{j+1}$. If no $R_{j+1}$ exists, that is j=N, the process 70 valuates H as a sum over the entire set of previously calculated $R_j$'s (step 76). In terms of the $R_j$'s, H is evaluated from the formula:

$$H = a^T R = \sum_{j=2,\ldots N} a_j R_j.$$

A straightforward evaluation of this formula involves of order N simple arithmetic operations. Since the recursive evaluation of the set of $R_j$'s involved of order N simple arithmetic operations, the process 70 reduces the number of simple arithmetic operations from order $N^2$ to order N.

As numbers, N, of physical storage volumes on storage disks grow the time needed to calculate seek times increases. The reduction in the number of arithmetic operations needed to find the product H, which the process 70 provides, can produce a significant timesaving for calculations of seek times.

Figure 6:
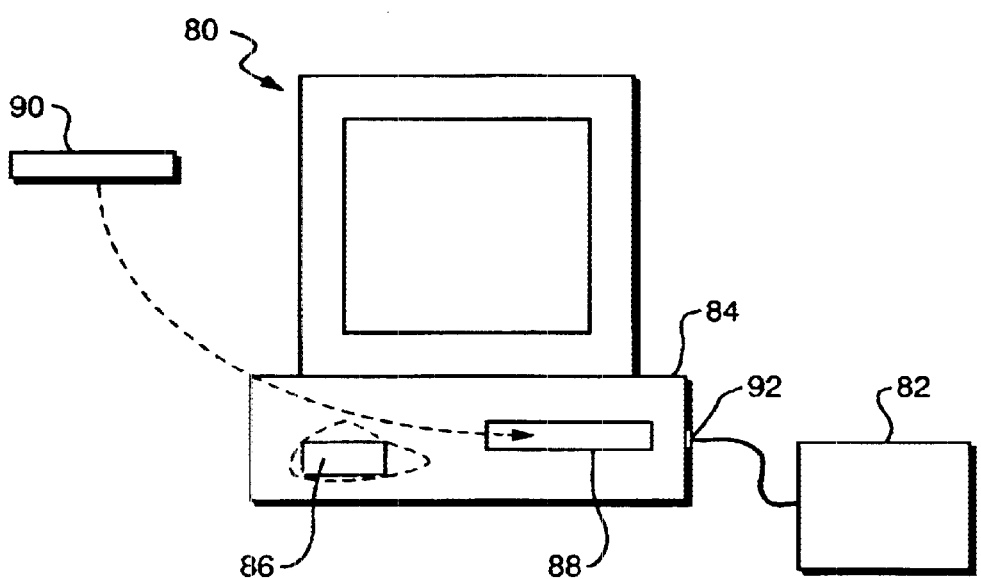
FIG. 6 shows a monitoring system that calculates disk seek times and controls inter-disk and/or intra-disk swaps.

FIG. 6 shows one embodiment 80 of the external system 34, shown in FIG. 2, that collects activity data, determines seek times, and may control swaps between physical disks of a high-capacity storage disk 82. The system 80 includes a computer 84 having an active memory 86, a disk drive 88, and an input/output port 92. The active memory 86 stores an executable program of instructions for determining seek times according to one or more of processes 40, 60, and 70 illustrated in FIGS. 3, 4, and 5, respectively. The program may also be stored in executable form on a program storage media 90, for example, an optical or magnetic disk, which is readable by the disk drive 88. The input/output port 92 receives activity data on accesses to physical storage surfaces of the high-capacity storage disk 82. The input/output port 92 may also send commands for swapping data volumes and/or changing access queue lengths to the high-capacity disk storage 82 based on calculated seek times.

SWAPPING STORAGE VOLUMES

Figure 7:
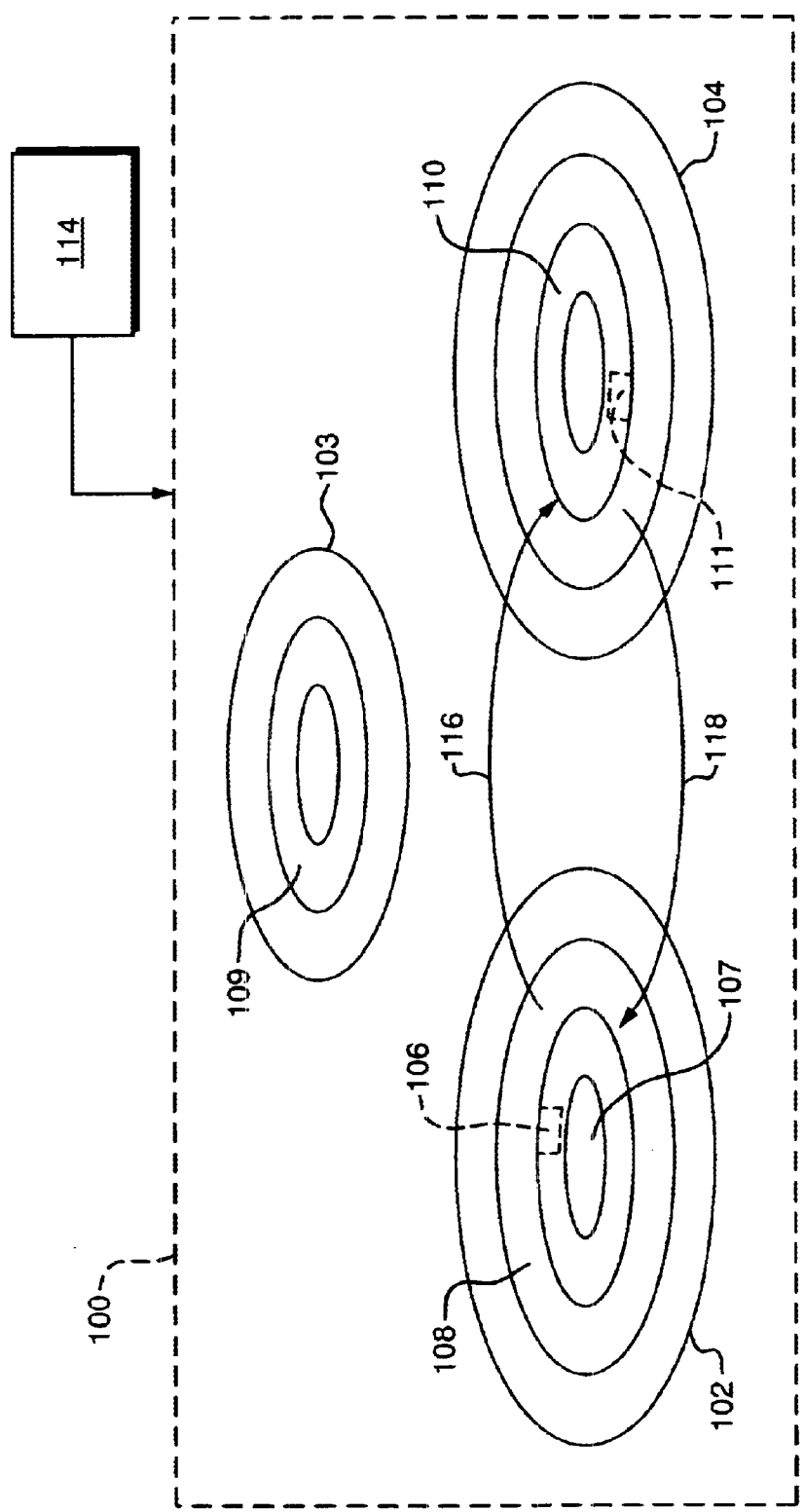
FIG. 7 shows a storage subsystem that has multiple physical disks.

FIG. 7 shows a simple storage subsystem 100 that has multiple physical storage disks 102–104. The disks 102–104 include physical storage volumes 106–111 and may have different access loads. To reduce the access loads of heavily accessed disks, a control system 114, such as system 80 of FIG. 6, can perform swaps of whole physical storage volumes 106–111 between the disks 102–104. Typically, reducing access loads of heavier accessed disks leads to the access loads of the various disks being more balanced.

A swap between a pair of storage volumes 106–111 moves the data stored on each member of the pair to the other member of the pair. Lines 116 and 118 illustrate data movement for an exemplary swap pair of storage volumes 108 and 111. A swap includes several physical moves of the data from each storage volume of the pair. The first moves copy the data from each volume of the pair to a temporary storage buffer. The second moves recopy the data from the temporary storage to the other volume of the pair. The use of a temporary storage buffer ensures that data availability is not compromised during the swap process. At each time during a swap one copy of the data being swapped is available to other applications, i.e., either the data in the original storage volumes or a copy of the data stored in the temporary storage buffer. The data moves occurring during a swap are further described in the U.S. Patent Applications incorporated by reference herein.

Swaps can exchange compatible pairs of physical storage volumes, that is, volumes having the same size and emulation. Emulations may take a constant key and data (CKD) format used by mainframe systems or a fixed block architecture (FBA) format used by systems compatible with UNIX® operating systems licensed by UNIX System Laboratories, Inc. or with Windows NT® operating systems offered by Microsoft Corporation. But, swap compatibility constraints frequently leave additional freedom in the choice of swap volume pairs. The remaining freedom may be used to select pairs of volumes that optimally reduce access loads of the disks participating in the swaps. Performing swaps that optimally reduce access loads more efficiently uses scarce resources needed to perform swaps, e.g., temporary buffer space and data transfer busses, and results in more rapid reductions of heavy access loads.

Herein, disk access loads are measured either by total access times or by seek times. The use of total access times is available in storage subsystems that provide monitoring data on both activities of physical storage volumes and amounts of data transferred during accesses.

Figure 8A:
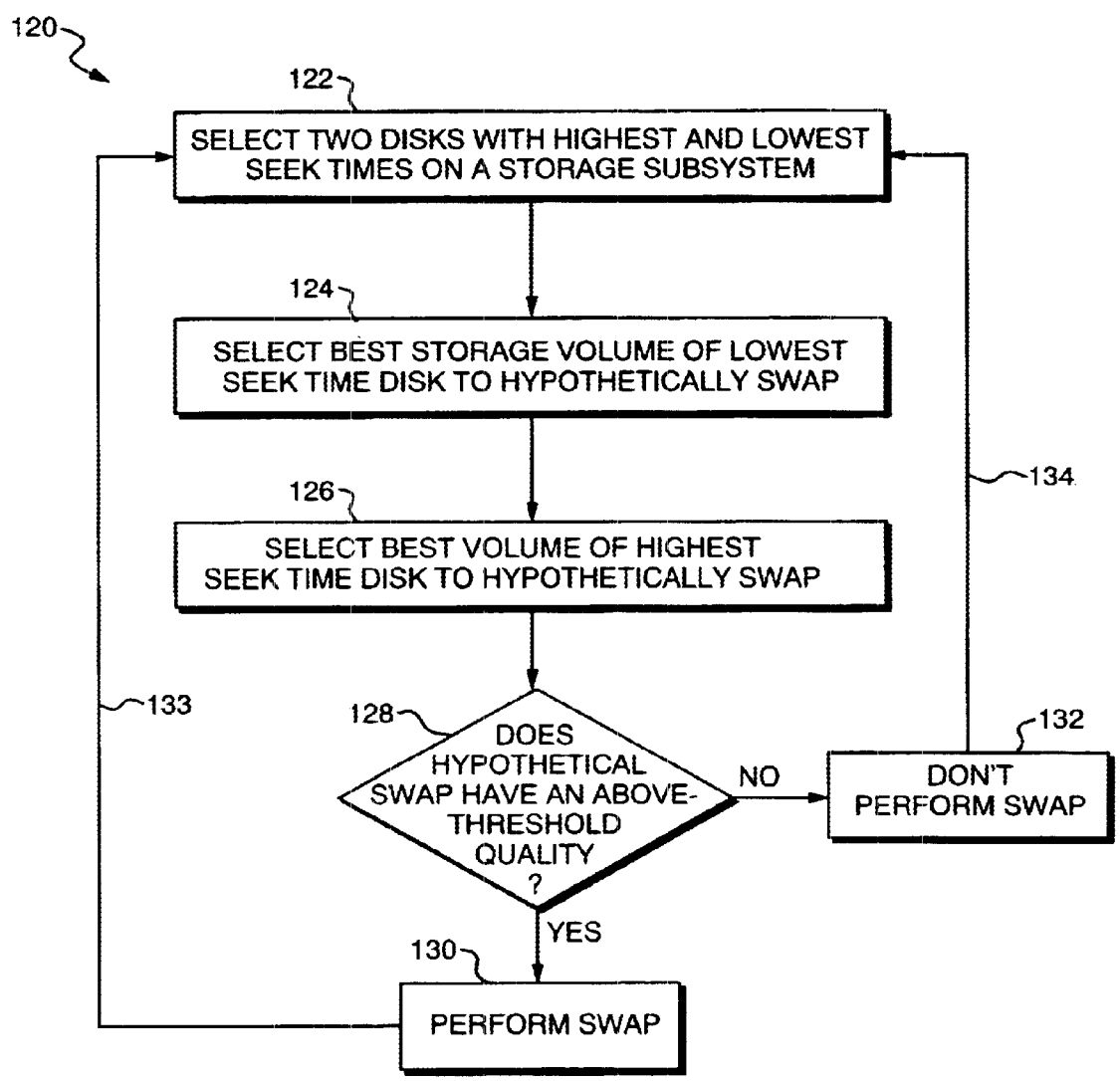
FIG. 8A is a flow chart for a process that reduces seek times of a set of physical storage disks by performing inter-disk swaps.

FIG. 8A is a flow chart for a process 120 that swaps physical storage volumes between disks to reduce disk seek times in a storage subsystem. The process 120 selects a pair of physical disks that have the highest and the lowest seek times of a storage subsystem (step 126). To perform the selection, the process 120 sorts the physical disks of the storage subsystem based on seek times.

Next, the process 120 selects a best storage volume to hypothetically swap from the lowest seek time disk (step 124).

The best storage volume has the lowest or one of the lowest activities on the lowest seek time disk. Hypothetically [[Swapping]] swapping the volume with the lowest activity produces the lowest new activity value on the highest seek time disk. The lowest new activity value produces the largest seek time reduction for the highest seek time disk. The largest reduction results, because Wong's formula gives a seek time that monotonically decreases as the activity of any volume of a disk decreases.

The monotonic dependence of seek time on individual volume activities can be shown from Wong's formula if the head travel time function satisfies a triangle inequality. The triangle inequality has the form:

$$t_{kr}+t_{rj} \geq t_{kj}.$$

For head travel time functions satisfying this inequality, hypothetically swapping the least active volume of the lowest seek time disk results in the largest seek time reduction for the highest seek time disk of the storage subsystem.

In other embodiments, the best volume of the lowest seek time disk is defined by its effect on the seek time of that disk.

The process 120 selects a best storage volume to swap from the highest seek time disk (step 126). To select the best storage volume, the process 120 calculates reductions in the seek time, $\delta_p S$, of the disk, which would result from a hypothetical swap of a storage volume "p" of the highest seek time disk. $\delta_p S$ is the seek time of a new state of the disk, which is produced by hypothetically swapping storage volume p with the already selected storage volume of the lowest seek time disk, minus the seek time of the original state of the highest seek time disk.

The process 120 calculates $\delta_p S$ for each state produced by a single swap of a volume "p" of the highest seek time disk and the already selected volume of the lowest seek time disk. Prior to each hypothetical swap defining a $\delta_p S$, the disk is in the same original state wherein the disk's state is defined by a set of activity values for physical storage volumes of the disk. The process 120 identifies the storage volume "p" corresponding to the largest reduction to the seek time, $\delta_p S$, that is, the maximum value in the set { $\delta_p S$ }, as the best hypothetical swap volume of the highest seek time disk.

After selecting the pair of physical volumes to swap, the process 120 determines whether the hypothetical swap has an above-threshold quality (step 128). The quality of a swap is determined by the size of seek time reduction that the hypothetical swap produces for the highest seek time disk. If the reduction to the seek time has an above threshold value, the process 120 performs the swap of the selected pair of physical storage volumes (step 130). If the reduction does not have an above-threshold value, the process 120 does not perform the swap of the selected pair of storage volumes (step 132). After determining the quality of the selected hypothetical swap, the process 120 loops back 133, 134 to repeat the selection process.

Figure 8B:
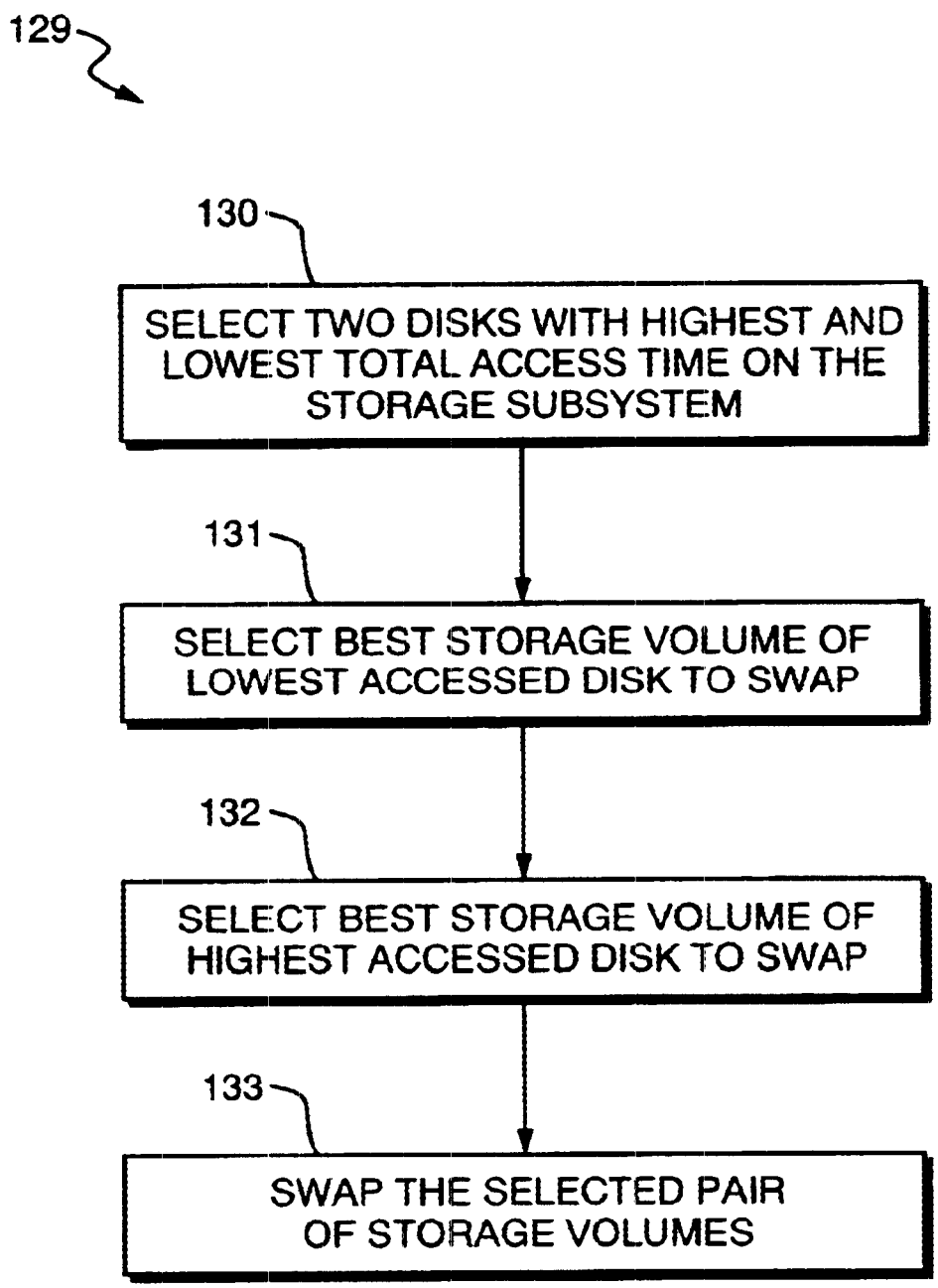
FIG. 8B is a flow chart for a process that reduces total access times of a set of physical storage disks by performing inter-disk swaps.

FIG. 8B is a flow chart for an alternate process 129 that performs inter-disk swaps of physical storage volumes to reduce disk total access times in a storage subsystem. The process 129 sorts the physical disks of the storage subsystem based on total access times. Then, the process 129 selects a pair of physical disks that have the respective highest and lowest total access times of the storage subsystem (step 130). Next, the process 129 selects a best storage volume to swap from the disk with the lowest total access time (step 131).

In one embodiment, the best storage volume has the lowest or one of the lowest activities on the disk with the lowest total access time. Swapping the least active volume ordinarily produces a swap that produces the best reduction to total access time for the disk with the highest total access time.

In other embodiments, the best volume of the disk with the lowest total access time is defined by its effect on the total access time of that disk. In this embodiment, swapping the best volume with a selected virtual volume having a high activity produces the largest reduction to the total access time of the disk with lowest total access time.

The process 129 selects a best storage volume to swap from the disk with highest total access time (step 132). To select the best storage volume, the process 129 calculates reductions in total access time, $\delta'_p S$, of the disk, which would result from a swap of a storage volume "p" of the disk with highest total access time. The total access time is the sum of the seek, rotational latency, and data transfer times. $\delta'_p S$ is the total access time of a new state of the disk, which is produced by swapping storage volume p with the already selected storage volume of the disk with lowest total access time, minus the total access time of the original state of the disk with highest total access time.

The process 129 calculates $\delta'_p S$ for each state produced by a single swap of a volume "p" of the highest total access time disk and the already selected volume of the lowest total access time disk. Prior to each swap defining a $\delta'_p S$, the disk is in the same original state. For this embodiment, a disk's state is defined by a set of collected activity values and data transfer quantities for physical storage volumes of the disk. The process 129 identifies the storage volume "p" that produces the largest reduction to the total access time, $\delta'_p S$, that is, the maximum value in the set $\{\delta'_p S\}$, as the best swap volume of the disk with highest total access time. The process 129 performs and inter-disk swap of the selected pair of physical storage volumes (step 133).

Figure 9:
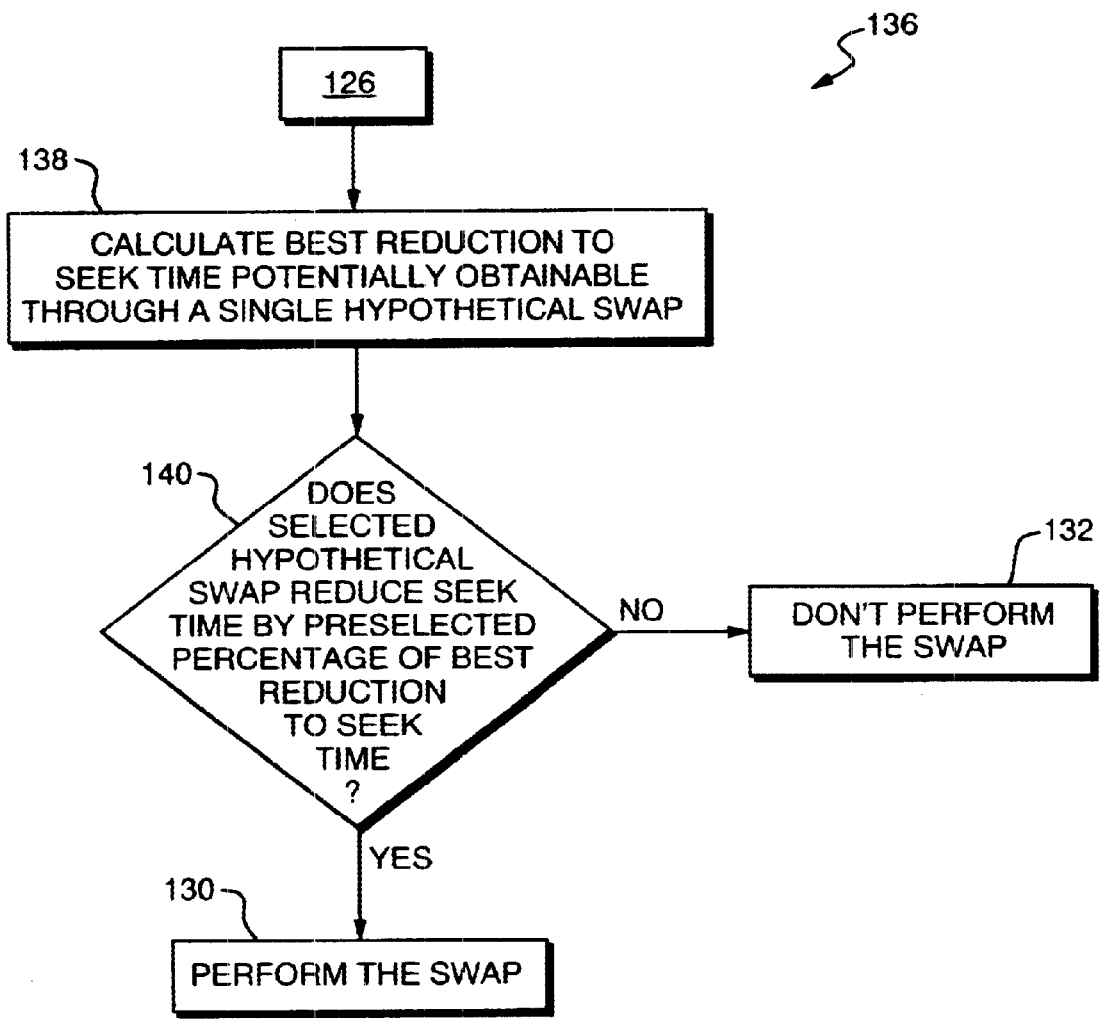
FIG. 9 is a flow chart for a process that rates inter-disk swap qualities.

FIG. 9 is a flow chart for a process 136 that rates the quality of a selected swap for process 120 of FIG. 8. To rate a swap's quality, the process 136 calculates a best seek time reduction (BSTR) that is potentially obtainable for the highest seek time disk through a single hypothetical swap (step 138). The BSTR is an upper bound that limits any actual seek time reductions resulting from a single hypothetical swap.

After calculating the BSTR, the process 136 determines whether the selected hypothetical swap will reduce the seek time of the highest seek time disk by at least a preselected percentage of the BSTR (step 140). The process 136 calculates the seek time reduction for the selected hypothetical swap from the Wong's formula and activity data. If the seek time reduction produced by the selected hypothetical swap is as large as the preselected percentage of BSTR, the quality of the selected hypothetical swap is high, and the swap is performed (step 130). If the reduction to the seek time produced by the selected hypothetical swap is not as large as the preselected percentage of BSTR, the quality of the selected hypothetical swap is low, and the swap is not performed (step 132).

Figure 10:
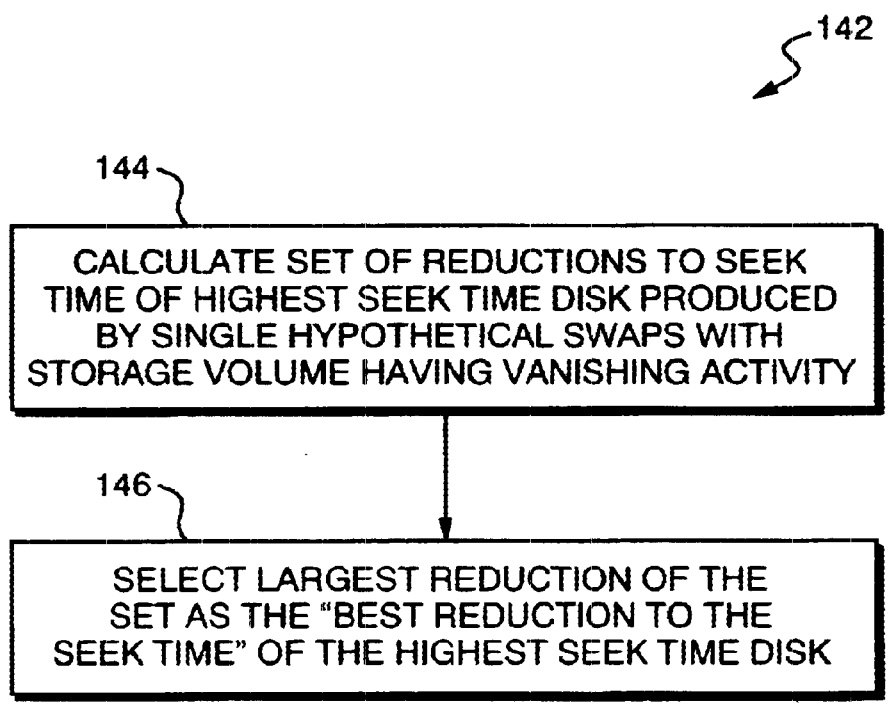
FIG. 10 is a flow chart for a process that determines a threshold value used to rate a swap's quality in the process of FIG. 9.

FIG. 10 shows a process 142 for finding the BSTR used to rate swap quality. To determine the BSTR, the process 142 calculates a set of reductions to the seek time $\{\delta_{p,virtual}S\}$ of the highest seek time disk (step 144). Herein, each $\delta_{p,virtual}S$ is the seek time reduction for the highest seek time disk that is produced by hypothetically swapping a storage volume "p" of the disk with an external virtual storage volume. The external virtual storage volume has zero activity. Thus, hypothetically swapping the virtual volume produces the lowest possible activity in the highest seek time disk. Hypothetically [[Swapping]] swapping the virtual storage volume produces the best seek time reduction for the highest seek time disk that is obtainable through a hypothetical swap of storage volume "p".

The calculation of each $\delta_{p,virtual}S$ is based on a new activity vector a(p) of the highest seek time disk, which is produced by [[a]] hypothetically swapping the volume "p" and the virtual storage volume. The components, $a(p)_k$, of the new activity vector, a(p), are given by:

$a(p)_k = a_k$, for $k \neq p$, and $a(p)_k = 0$, for $k = p$.

Here, a is the activity vector of the highest seek time disk prior to the hypothetical swap. The process 142 calculates the set of seek time reductions $\{\delta_{p,virtual}S\}$ from Wong's formula.

After calculating the potential seek time reductions $\{\delta_{p,virtual}S\}$ for each volume "p", the process 142 selects largest member in the set $\{\delta_{p,virtual}S\}$ to be BSTR (step 146). Thus, the BSTR is the largest seek time reduction that can be achieved for the highest seek time disk through any swap with an external storage volume.

Since the BSTR is caused by a particular swap, the BSTR provides a relative process for rating a hypothetical swap's quality with respect to the best reduction to seek time potentially obtainable through a single hypothetical swap. Relative rating differs from absolute rating, which bases a swap's quality on the total seek time reduction produced. For a larger disk, the relative rating process, e.g., as used by process 136 of FIG. 9, naturally accounts for the fact that more hypothetical swaps are frequently needed to achieve a selected absolute reduction to the disk's seek time. A rating process based on the BSTR is better suited for use with larger disks having many storage volumes and with storage subsystems having disks having different sizes.

Sets of seek time reductions, that is either $\{\delta_p S\}$ or $\{\delta_{p,virtual}S\}$, can be calculated through fewer arithmetic operations if the travel time function between volumes "j" and "k" is a reference travel time function, $t_{jk}^{Ref}$, having the form:

$t_{jk}^{Ref} = \alpha^{|j-k|}$.

Processes to calculate seek times associated with reference travel time functions are described above. Those processes evaluate Wong's formula by performing of order "N" simple arithmetic operations where "N" is the number of physical volumes on a physical disk.

Figure 11:
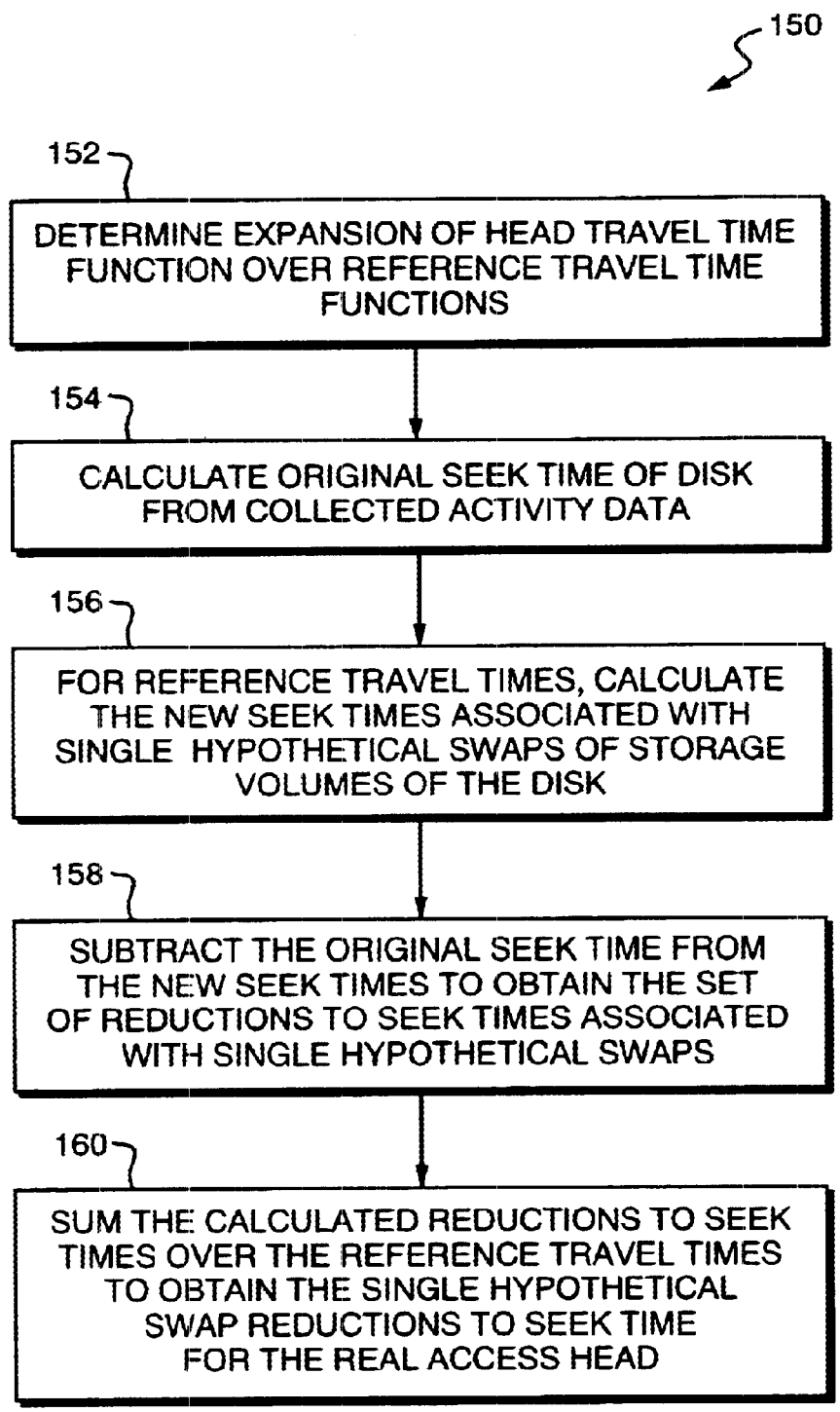
FIG. 11 is a flow chart showing a process for calculating seek time reductions produced by inter-disk swaps.

FIG. 11 is a flow chart showing a process 150 that calculates seek time reductions produced by single hypothetical swaps of disk storage volumes "p" with an external storage volume. The hypothetical swap of storage volume "p" produces activity vector $a^{new}(p)$ whose p-th component differs from original activity vector a of the disk. The original activity vector a is determined from previously collected activity data for the disk. For the hypothetical swap of volume "p", the components, $a^{new}(p)_k$, of the new activity vector $a^{new}(p)$ have the form:

$a^{new}(p)_k = a_k$, for $k \neq p$, and $a^{new}(p)_k = a_p + \Delta(p)$, for $k = p$.

Hypothetically [[Swapping]] swapping the storage volume "p" changes $a^{new}(p)_p$ by an amount $\Delta(p)$, which changes $a_p$ to the activity of the external volume prior to the hypothetical swap, i.e., $\Delta(p) = -a_p + a^{external\ volume}$.

To calculate a seek time of an access head, the process 150 obtains expansion coefficients, $d_n$, for the access head's travel time function, $t_{jk}$, over a set of the reference travel time functions, $t_{jk}^{Ref}(n)$ indexed by "n" (step 152). The coefficients, $d_n$, may be obtained from a file listing the coefficients, $d_n$, for various access heads, or may calculated from data on the actual travel time function for the disk's access head. The expansion takes the following form:

$$t_{kj} = \sum_{n=0,\ldots m} d_n t_{kj}^{Ref}(n).$$

For each reference travel time function of the expansion set, the process 150 calculates the original seek time, $S^{original}(n)$, from the original activity vector a (step 154). The process 150 evaluates the original seek times, $S^{original}(n)$, for the reference travel time functions, $t_{jk}^{Ref}(n)$, using the fast processes 60 and 70, shown in FIGS. 4 and 5.

For each reference travel time function, $t_{jk}^{Ref}(n)$, of the set, the process 150 calculates a set of new seek times {$S^{new}(n,p)$} (step 156). Each $S^{new}(n,p)$} is associated with one of the new activity vectors in the set {$a^{new}(p)$} that are produced by hypothetically swapping single storage volumes of the disk with the external storage volume. The calculations of the new seek times, $S^{new}(n,p)$, use Wong's equation and are described below. For each reference travel time function, $t_{jk}^{Ref}(n)$, the process 150 subtracts the original seek time, $S^{original}(n)$, from each new seek time, $S^{new}(n,p)$, to determine the seek time reduction, $\delta S(n,p)$, associated with each hypothetical swap (step 158).

The process 150 forms a set of weighted sums of the calculated seek time reductions, $\delta S(n,p)$, for single hypothetical swaps (step 160). Each sum is over the integer "n", which indexes the expansion reference travel time functions, $t_{jk}^{Ref}(n)$. The sums provide the set of seek time reductions, e.g., $\delta_p S$ or $\delta_{p,virtual} S$, for the real access head of the disk (step 158). The sums take the following form:

$$\delta S(p) = \sum_{n=1,\ldots m} d_n \delta S(n, p).$$

The form of $\delta S(p)$ as a sum, which is weighted by expansion coefficients for the actual head travel time function, $t_{jk}$, over the reference travel time functions, $t_{jk}^{Ref}(n)$, results from the linearity of Wong's equation in the travel time function.

Referring again to FIGS. 8A and 10, processes 120 and 142 perform process 150 to calculate seek time reductions that single swaps produce for the highest seek time disk. The process 120 performs the process 150 to calculate the set of seek time reductions {$\delta_p S$} produced by hypothetical swaps of storage volumes of the highest seek time disk with the selected external volume. The process 120 selects the best volume of the highest seek time disk to hypothetically swap by comparing the $\delta_p S$'s. The process 142 performs the process 150 to calculate the set of seek time reductions {$_{p,virtual} S$} produced by hypothetical swaps with the virtual volume having zero activity.

Figure 12:
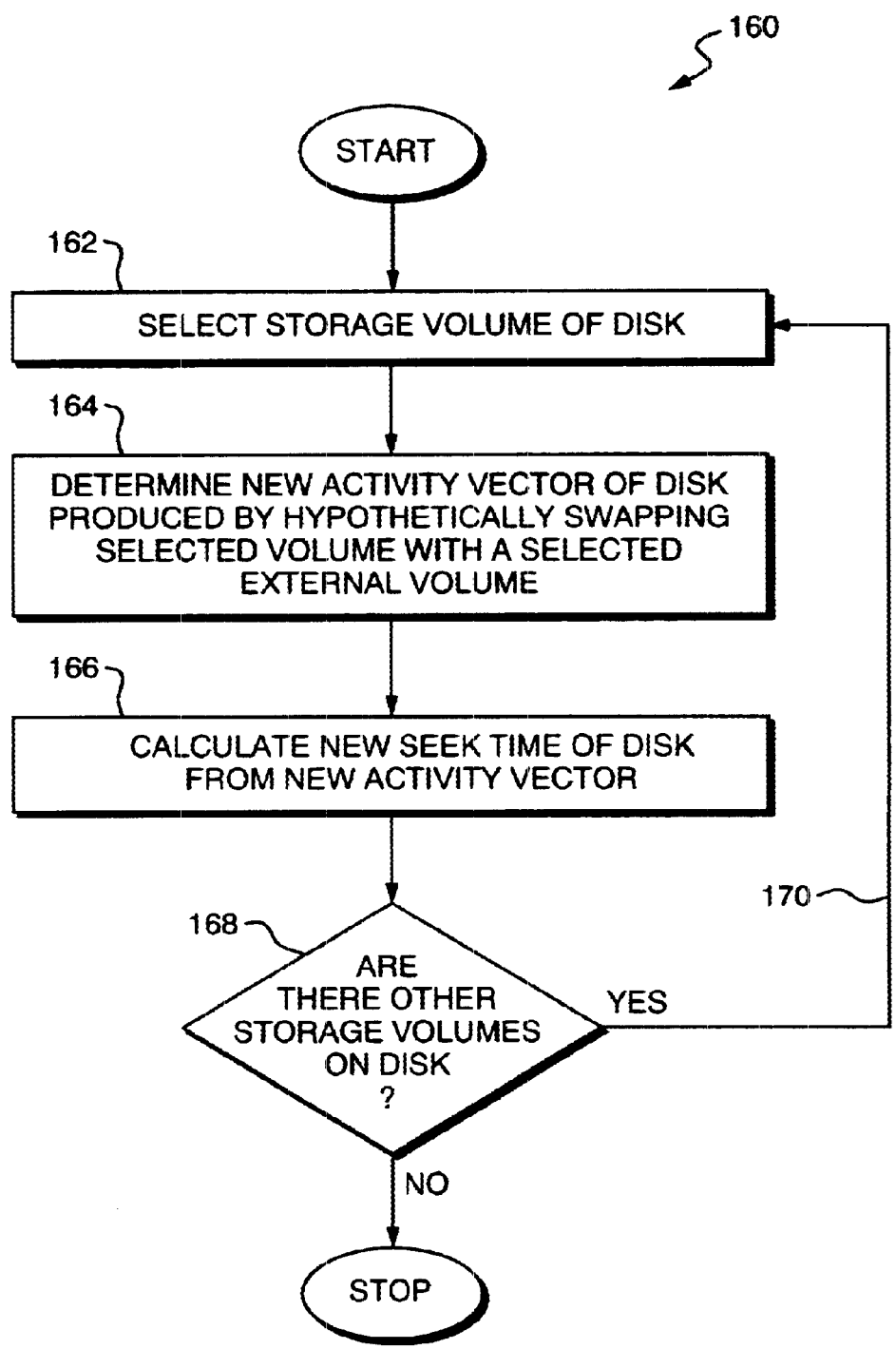
FIG. 12 is a flow chart for a process that calculates new seek times produced by inter-disk swaps for reference travel time functions.

FIG. 12 is a flow chart for a process 160 that calculates a set of new seek times {$S^{new}(n,p)$} associated with reference travel time functions $t_{kj}^{Ref}(n)$. The new seek times result from single hypothetical swaps of the storage volumes of a disk with a preselected external storage volume.

From the disk, the process 160 selects a physical storage volume "p" (step 162). For the selected volume "p", the process 160 determines a new activity vector $a^{new}(p)$ that is produced by hypothetically swapping of the selected volume "p" with the preselected external storage volume (step 164). The new activity $a^{new}(p)$ has components, $a^{new}(p)_k$, which are given by:

$$a^{new}(p)_k = a_k, \text{ for } k \neq p, \text{ and } a^{new}(p)_p = a_p + \Delta(p), \text{ for } k = p.$$

Here, $\Delta = -a_p + a^{external\ volume}$ with $a^{external\ volume}$ equal to the activity of the preselected external volume and a equal to the original activity vector for the disk.

From the new activity vector $a^{new}(p)$, the process 160 calculates the new seek y time $S^{new}(n,p)$ by performing processes 50 and 60, shown in FIGS. 4 and 5 (step 166). The process 160 determines whether other storage volumes remain in the disk (step 168). If other storage volumes remain, the process loops back 170 to repeat the calculation of a new seek time associated with a hypothetical swap between one of the remaining storage volumes and the preselected external volume. If other storage volumes do not remain, the process 160 stops.

The process 160 repeats steps 162, 164, 166, and 168 "N" times to determine the $S^{new}(n,p)$ for each volume "p" of the disk. Each repetition of step 166 includes performing processes 50 and 60 of FIGS. 4 and 5, which involve doing of order "N" simple arithmetic operations. Thus, the process 160 performs of order $N^2$ simple arithmetic operations to determine the set {$S^{new}(n,p)$} for each storage volume "p" on the disk.

Figure 13:
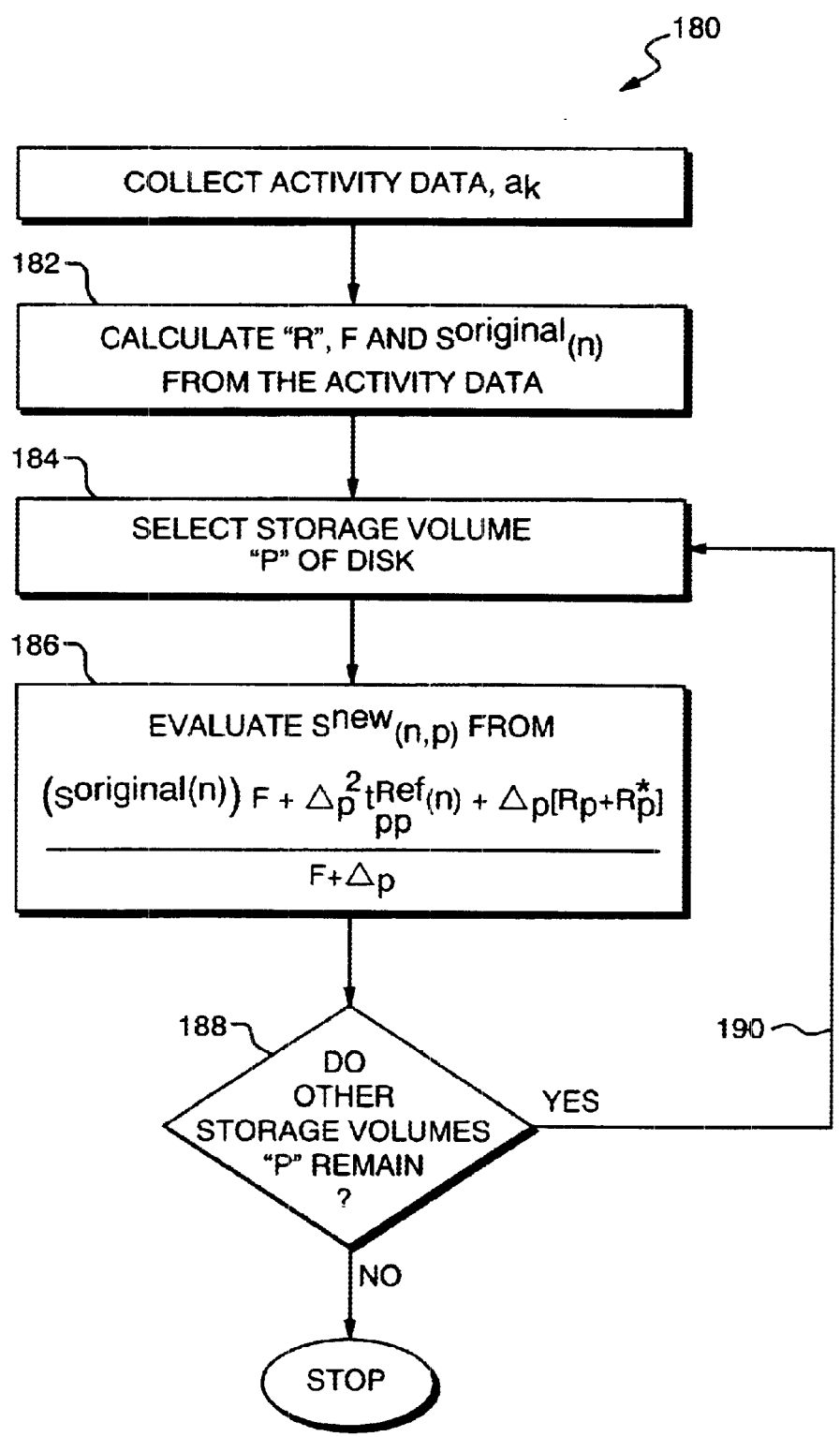
FIG. 13 is a flow chart for an alternate process that calculates new seek times produced by inter-disk swaps for reference travel time functions.

FIG. 13 is a flow chart showing an alternate process 180 for calculating the set of new seek times {$S^{new}(n,p)$}. The alternate process 180 determines the entire set {$S^{new}(n,p)$} by performing of order N simple arithmetic operations. For large disks, this number is a much smaller than the number of operations performed by the process 160 of FIG. 12 to calculate the same set of seek times.

To describe the alternate process 180, Wong's formula is rewritten in a new form. The new form expresses $S^{new}(n,p)$ in terms of the original activities {$a_k$} of the disk and the change, $\Delta(p)$, to the activity vector. In terms of the original activities {$a_k$} and $\Delta(p)$, $S^{new}(n,p)$ is given by:

$$S^{new}(n, p) = \left\{ a^T T a + \Delta(p)^2 T_{pp} + \Delta(p) \left[ \sum_{k=1,\ldots N} [T_{pk} + T^*_{pk}] a_k \right] \right\} / \left\{ \sum_{k=1,\ldots N} a_k + \Delta(p) \right\}.$$

This formula can be rewritten in terms of previously described objects in the form:

$$S^{new}(n,p) = \{[S^{original}(n)]F + \Delta(p)^2 t^{Ref}_{pp}(n) + \Delta(p)[R_p + R^*_p]\}/\{F + \Delta(p)\}.$$

The object F is the total activity of the disk, which is defined by:

$$F = \sum_{k=1,\ldots N} a_k.$$

For reference head travel time functions, $t^{Ref}_{k,j}(n)$, the (j+1)-th component, $R_{j+1}$, of object R is recursively defined by:

$$R_{j+1} = (R_j + a_j) t^{Ref}_{j+1,j}(n), \text{ for } j \geq 1, \text{ and } R_1 = 0.$$

The N component vector object R was described in relation to processes 60 and 70 of FIGS. 4 and 5. $S^{original}(n)$ is the seek time of the disk prior to the swap. Processes 60 and 70, shown in FIGS. 4 and 5, can calculate the objects R, F, and $S^{original}(n)$ through of order N operations, and the results are independent of "p".

The last formula for the new seek time, $S^{new}(n,p)$, also holds for head travel time functions of the form:

$$t_{kj} = x_j, \text{ for } j = k, \text{ and } t_{kj} = K|j-k|, \text{ for } j \neq k.$$

For head travel functions of this form, the vector object R is evaluated from the general definition $$R_k = \sum_{j=1,\ldots N} T_{kj} a_j$$

by a different procedure due to Wong. The procedure can also determine the objects R and $S^{original}(n)$ by performing of order N simple arithmetic operations.

To determine the new seek time, $S^{new}(n,p)$, the process 180 calculates the objects R, F, and $S^{original}(n)$ by performing processes 60 and 70 with the activity data collected prior to the swap (step 182). The calculations of R, F, and $S^{original}(n)$ use the original activities {$a_k$} collected for the disk. The calculation of each component of the vector object R uses the recursive process 70, shown in FIG. 5. After calculating the objects R, F, and $S^{original}(n)$, the process 180 selects a storage volume "p" of the disk (step 184). For the selected storage volume "p", process 180 evaluates the above formula for $S^{new}(n,p)$ using the previously calculated values of $S^{original}(n)$, F, R and the diagonal components of the reference travel time function, $t^{Ref}_{pp}(n)$ (step 186). The process 180 determines whether new seek times, $S^{new}(n,p)$, remain to be evaluated for other values of "p" (step 188). If other values of "p" remain, the process 180 loops 190 back to perform the evaluation for another storage volume of the disk. If other values of "p" do not remain, the process 180 stops.

In the process 180, the determination of objects $S^{original}(n)$, F, and R entails of order N simple arithmetic operations. Furthermore, the evaluation of each seek time $S^{new}(n,p)$ from these objects involves of order one simple arithmetic operations, because each evaluation does not involve summing over storage volumes of the disk. Thus, the process 180 calculates the entire set of new seek times $\{S^{new}(n,p)\}$ for the N storage volumes of the disk by performing of order N simple arithmetic operations. Thus, evaluating new seek times has an amortized cost that equals of order one simple arithmetic operation per hypothetical swap pair for which a new seek time is evaluated.

The process 180 determines the set $\{S^{new}(n,p)\}$ used to select best swap volumes and to calculate the BSTR threshold by performing substantially fewer arithmetic computations. The lower number of needed arithmetic computations makes processes for finding best swaps more available to storage subsystems, e.g., the system 80 of FIG. 6, that swap data storage volumes to reduce disk access loads.

SWAPPING STORAGE VOLUMES ON THE SAME DISK

The organization of storage volumes on a single disk can also influence the disk's total access time. For example, if the disk has two heavily accessed storage volumes that are far apart, the disk's access head may expend large amounts of time traveling between the two volumes. In such situations, moving the two heavily accessed storage volumes closer together can lower the disk's seek time and improve the disk's total access time.

Figure 14A:
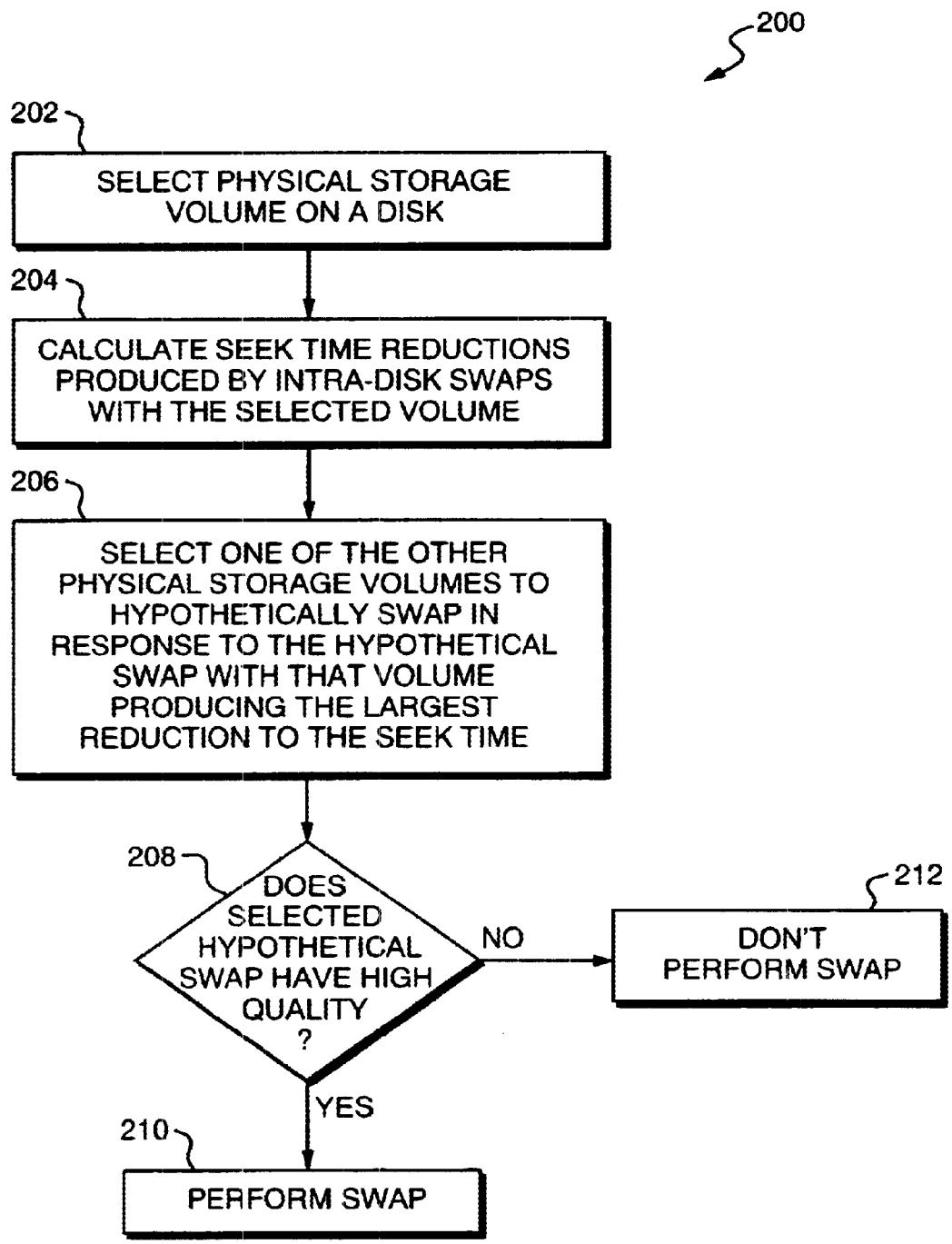
FIG. 14A is a flow chart for a process that reduces a disk's seek time by performing an intra-disk swap.

FIG. 14A is a flow chart for a process 200 that performs an intra-disk swap to reduce the disk's seek time. The process 200 selects a storage volume "q" to swap (step 202). Next, the process 200 evaluates seek time reductions $\{\delta S(p,q)\}$ produced by single intra-disk swaps of other storage volumes "p" with the selected volume "q" (step 204). The seek time reductions are calculated for single hypothetical swaps between each volume of the disk and the selected volume. Next, the process 200 selects one of the disk volumes "p" based on a comparison of the seek time reductions $\{\delta S(p,q)\}$ (step 206). The selected one of the volumes "p" produces the largest reduction to the disk's seek time when hypothetically swapped with the previously selected volume "q".

After selecting a pair of swap volumes indexed by (p,q), the process 200 determines whether the selected hypothetical swap pair has a high quality (step 208). The quality is determined by comparing the seek time reduction produced by the selected hypothetical swap to a predetermined threshold. High quality hypothetical swaps produce above threshold seek time reductions. The threshold may be a seek time reduction produced by a hypothetical swap with a predetermined external virtual hypothetical swap as described in relation to FIG. 9. This type of threshold rates the quality of the selected intra-disk swap against another "single" hypothetical swap. If the hypothetical swap has a high quality rating, the process 200 performs the swap of the selected pair of physical storage volumes (step 210). If hypothetical swap does not have a high quality rating, the process 200 does not perform the swap of the selected pair of storage volumes (step 212).

Figure 14B:
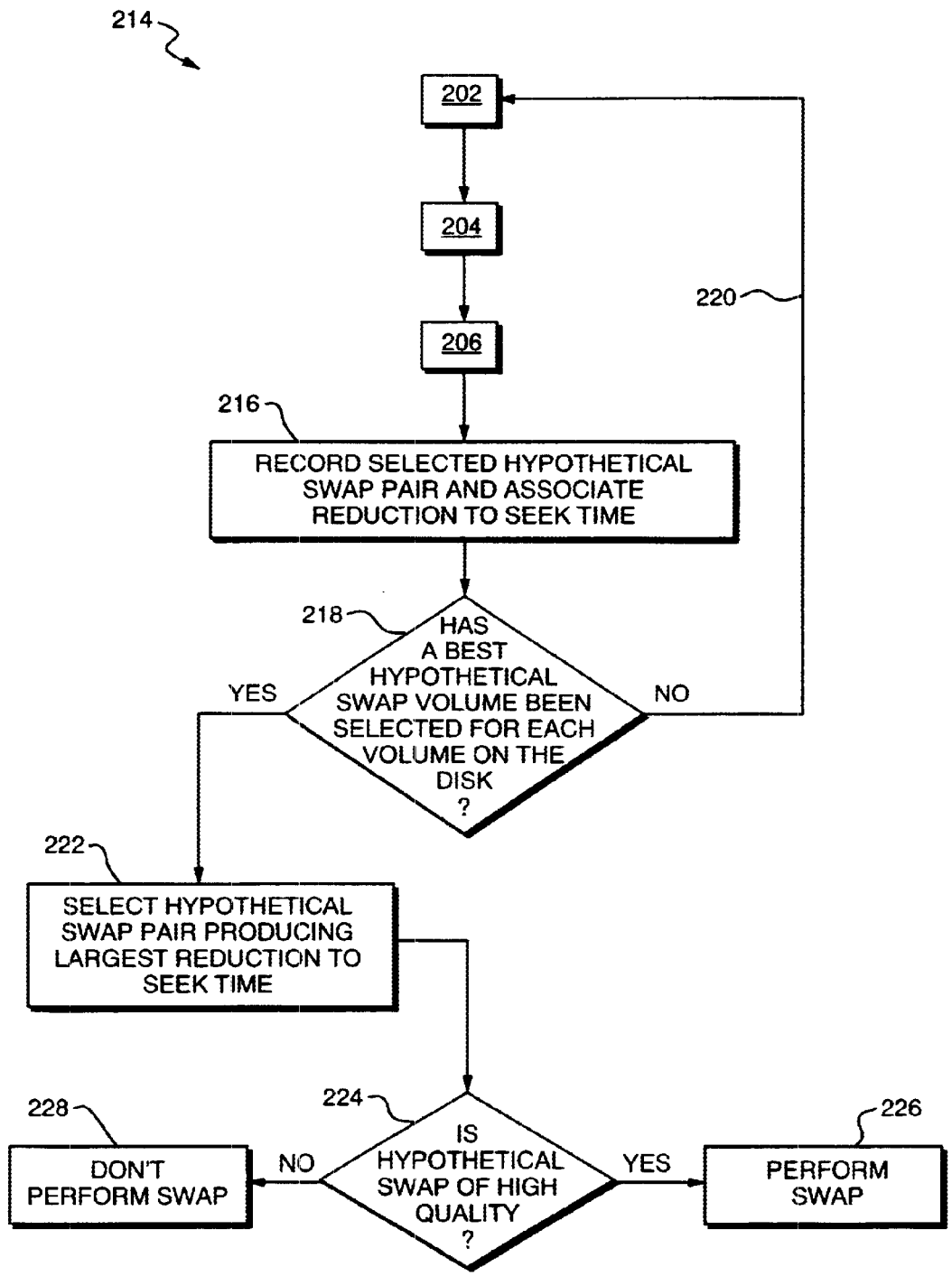
FIG. 14B is a flow chart for an alternate process that reduces a disk's seek time by performing an intra-disk swap.

FIG. 14B shows a flow chart for an alternate process 214 for swapping physical storage volumes on the same disk to reduce the disk's seek time. The process 214 performs steps 202, 204, and 206, which have already been described in relation to the process 200 of FIG. 14A. After completing step 206, the process 214 records identities for the volumes of the selected hypothetical swap pair and the associated seek time reduction in a file (step 216). Then, the process 214 determines whether a "best" hypothetical swap volume has been selected for each storage volume of the disk (step 218). If there remain storage volumes for which a best hypothetical swap volume have not been selected, the process 214 loops back 218 and repeats steps 202, 206, and 216 (step 220).

If the process 214 has selected a best hypothetical swap volume for each storage volume, the process 214 has created a file that lists pairs of hypothetical swap volumes indexed by (q,p) and associated reductions to the disk's seek time, $\delta S(p,q)$. From the list, the process 214 selects the volume pair that produces the largest reduction to the disk seek time (step 222). A hypothetical swap of the selected pair produces the largest reduction to the disk's seek time for an intra-disk swap. After selecting the best pair, the process 214 rates the selected pair's quality (step 224). The quality rating may based on a comparison of the seek time reduction associated with the hypothetical swap to the seek time reduction available through a predetermined virtual hypothetical swap as described with relation to FIG. 9. If the selected hypothetical swap is of high quality, the process 214 performs the swap (step 226). If hypothetical swap is not of high quality, the process 214 does not perform the swap (step 228).

As for inter-disk swaps, the set of seek time reductions $\{\delta S(p,q)\}$ can be calculated through fewer simple arithmetic operations for special travel time functions. The special travel time functions include reference travel time function, $t_{jk}^{Ref}$, which have the form:

$$t_{jk}^{Ref}(n) = \alpha(n)^{|j-k|} \text{ and}$$

other head travel time functions, $t_{kj}$, of the form:

$$t_{kj} = x_j, \text{ for } j=k, \text{ and } t_{kj} = K|j-k|, \text{ for } j \neq k.$$

Processes to calculate seek times associated with these special travel time functions have already been described.

Figure 15:
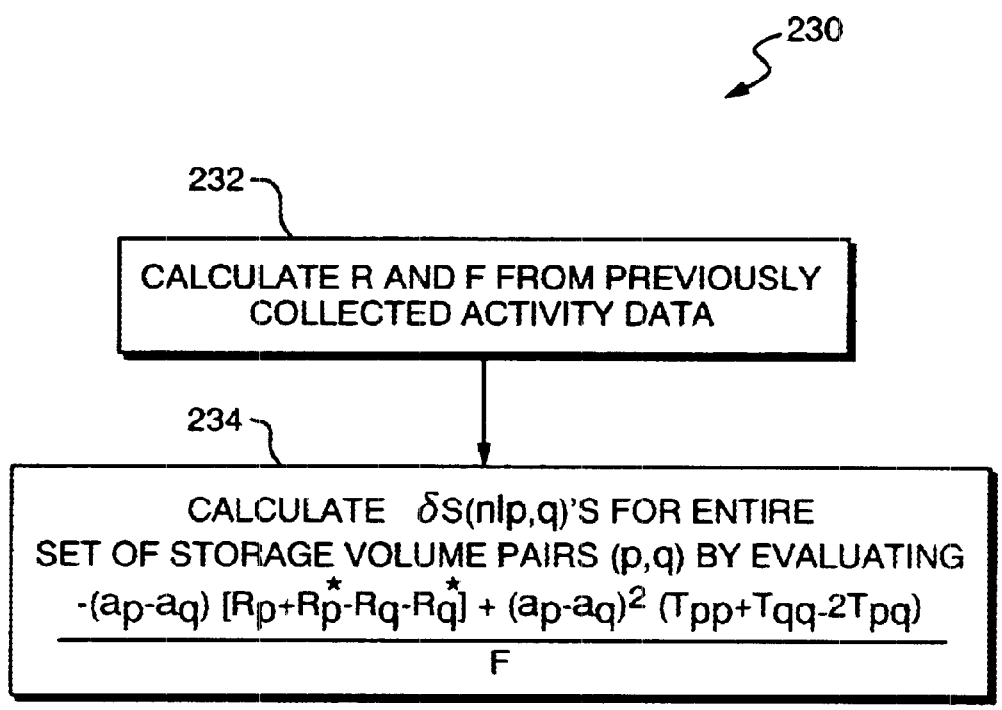
FIG. 15 is a flow chart for a process that calculates seek time reductions produced by intra-disk swaps for a reference travel time function.

FIG. 15 is a flow chart for a process 230 that calculates seek time reductions for a set of intra-disk swaps and a reference travel time function $t_{jk}^{Ref}(n)$. The process 230 calculates a set of seek time reductions $\{\delta S(n|p,q)\}$ for single intra-disk swaps for a preselected set of pairs of storage volumes indexed by (p,q).

Process 230 may be described by rewriting the formula for a new seek time, $S^{new}(n|p,q)$, produced by an intra-disk swap, in terms of the original activities, $a_k$, of the disk. An intra-disk swap of storage volumes "p" and "q" produces a new activity vector $a^{new}(p,q)$. The new activity vector $a^{new}(p,q)$ has the form:

$$a^{new}(p,q) = a + \Delta(p,q) \text{ with}$$

$$\Delta(p,q)_k = 0, \text{ for } k \neq p,q;$$

$\Delta(p,q)_p = a_q - a_p$, for $k=p$; and $\Delta(p,q)_q = a_p - a_q$, for $k=q$.

The vectors $a^{new}(p,q)$ and a have p-th and q-th components interchanged because of the intra-disk swap of the storage volumes "p" and "q".

Using the new activity vector $a^{new}(p,q)$, Wong's formula for the new seek time, $S^{new}(n|p,q)$, is given by:

$$S^{new}(n \mid p, q) = a^{new}(p, q)^T T a^{new}(p, q) \Big/ \sum_{k=1,\ldots N} a^{new}(p, q)_k.$$

This formula can be rearranged as follows:

$$S^{new}(n \mid p, q) = [a + \Delta(p, q)]^T T [a + \Delta(p, q)] \Big/ \sum_{k=1,\ldots N} a_k$$

$$= [a^T T a + \Delta(p, q)^T T a + a^T T \Delta(p, q) +$$

$$\Delta(p, q)^T T \Delta(p, q)] / F$$

$$= S^{original}(n) + [\Delta(p, q)^T R + R \Delta(p, q) +$$

$$\Delta(p, q)^T T \Delta(p, q)] / F.$$

Here, $S^{original}(n)$ is the disk's seek time prior to the swap. From the above form for $\Delta(p,q)$, $\delta S(n|p,q)$ may be written as:

$\delta S(n|p,q) = S^{new}(n|p,q) S^{original}(n)$, or $\delta S(n|p,q) = [-(a_p-a_q)[R_p + R_p^* - R_q - R_q^*] + (a_p-a_q)^2 (T_{pp} + T_{qq} - 2T_{pq})]/F$.

The object F is given by:

$$F = \sum_{k=1,\ldots N} a_k.$$

The k-th component of the vector object R is given by:

$$R_k = \sum_{j=1,\ldots N} T_{kj} a_j.$$

For reference travel time functions, $t^{Ref}(n)$, the vector object R is given recursively by:

$R_{j+1} = (R_j + a_j) t^{Ref}_{j+1,j}(n)$, for $j \geq 1$, and $R_1 = 0$.

For reference travel times, the objects "$R_p$" and F the evaluations of F and R were described in relation to processes 60 and 70 of FIGS. 4 and 5.

From the disk's original activity data, $a_k$, process 230 calculates the objects R and F using recursive processes described in relation to FIGS. 4 and 5 (step 232). From the calculated values of the objects R and F and the original activity data a, the process 230 evaluates the above formula to calculate each $\delta S(n|p,q)$ for the entire preselected set of intra-disk swap pairs (step 234).

In various embodiments the preselected set of swap pairs may include all pairs (p,q) of physical storage volumes on the disk or all pairs (p,q) for a selected physical storage volume "p". In the former case, process 230 calculates the set of associated seek times reductions $\{\delta S(n|p,q)\}$ by performing of order $N^2$ simple arithmetic operations. In the later case, process 230 calculates the set of associated seek times reductions $\{\delta S(n|p,q)\}$ by performing of order N simple arithmetic operations. In both cases, evaluating the set of reductions to seek times has an amortized cost equaling of order one simple arithmetic operation per swap pair (p,q) in the preselected set.

Figure 16:
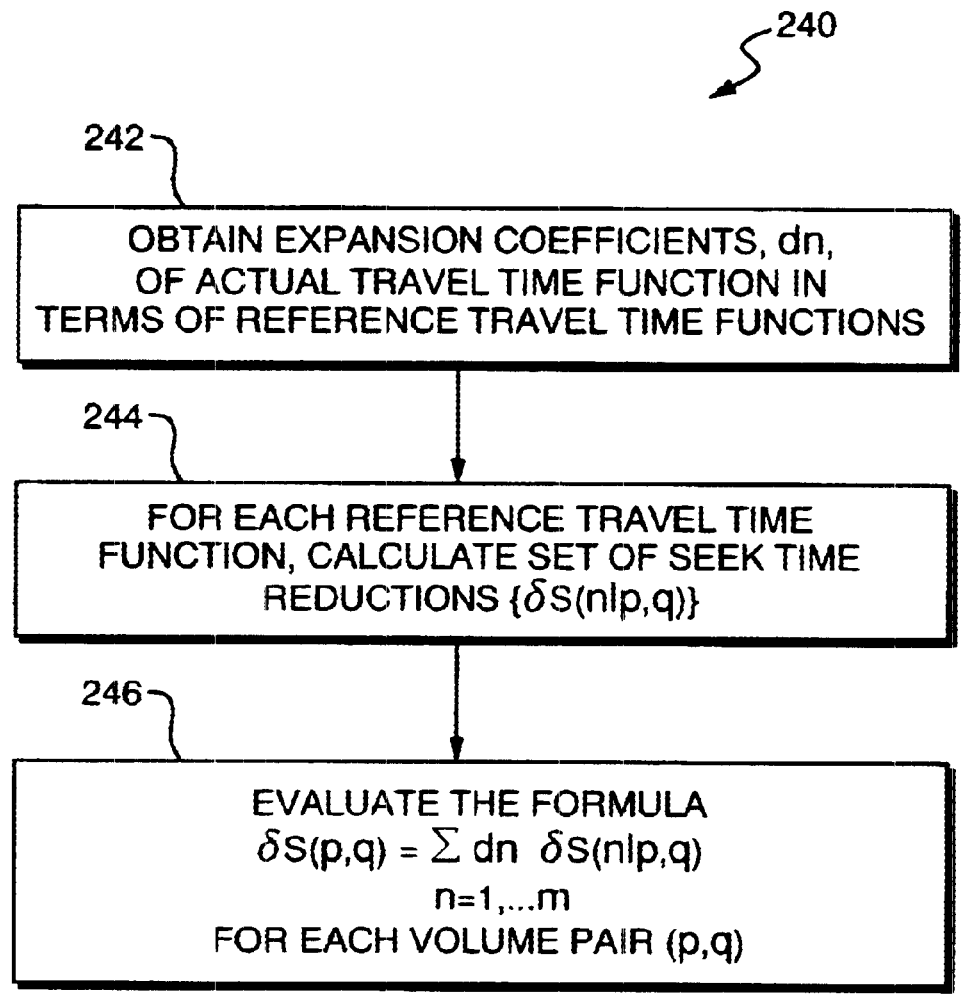
FIG. 16 is a flow chart for a process that calculates seek time reductions produced by intra-disk swaps.

FIG. 16 is a flow chart for a process 240 that calculates seek time reductions produced by intra-disk swaps of a set of preselected swap pairs. The preselected swap pairs may include all pairs of storage volumes of the disk or all pairs for which the first member is a selected volume. To determine a seek time, the process 240 obtains expansion coefficients, $d_n$, for the travel time function of the disk's actual access head, $t_{jk}$, over a set of the reference travel time functions, $t_{jk}^{Ref}(n)$ indexed by "n" (step 242). The expansion has the form:

$$t_{kj} = \sum_{n=0,\ldots m} d_n t_{kj}^{Ref}(n).$$

For each reference travel time function, $t_{jk}^{Ref}(n)$, the process 240 calculates the seek time reductions $\{\delta S(n|p,q)\}$ for the entire set of preselected swap pairs according to the process 230 of FIG. 15 (step 244). To determine the seek time reductions for the real disk access head, the process 240 evaluates weighted sums of the calculated seek time reductions, $\delta S(n|p,q)$ for the reference travel time functions (step 246). Each sum is over the integer "n", which indexes the different reference travel time functions, $t_{jk}^{Ref}(n)$, appearing in the expansion of the disk's actual head travel time function. The sums provide the desired set of reductions to the seek times $\{\delta S(p,q)\}$ for the real disk access head. Each sum takes the following form:

$$\delta S(p, q) = \sum_{n=1,\ldots m} d_n \delta S(n \mid p, q).$$

This sum is obtained from the expansion of the head function, $t_{jk}$, in terms of the reference functions, $t_{jk}^{Ref}(n)$, and the linearity of Wong's equation in the travel time function.

SWAPS ON DISKS WITH SEVERAL VOLUME SIZES

If a disk has physical storage volumes of several sizes, a storage subsystem can only swap an external physical storage volume with a portion of the disk's physical storage volumes, i.e., the volumes having the same size as the external volume. Though the storage subsystem can only swap a portion of its volumes with the external volume, Wong's formula for the new seek time produced by a swap still involves a sum over all physical storage volumes of the disk.

For disks with multiple sizes for physical storage volumes, processes 60 and 70 of FIGS. 4 and 5 still provide values for swap times if the disk head travel time function is a reference function $t^{Ref}_{jk}$ of the form:

$$t^{Ref}_{jk} = \alpha^{|L_j - L_k|}.$$

Here, $L_j$ and $L_k$ are distances of the disk's j-th and k-th physical storage volumes from the center of the disk. $|L_j - L_k|$ is the distance between the j-th and k-th physical storage volumes. This distance is proportional to $|j-k|$ if all storage volumes have the same size. Otherwise, $|L_j - L_k|$ is not be directly related to $|j-k|$. For such disks, the new form of the reference travel time function changes the equations for the vector object R.

For disks have multiple volume sizes, the vector object R is defined by a vector equation of the form:

$$\begin{bmatrix} R_1 \\ R_2 \\ R_3 \\ R_4 \\ \ldots \\ R_N \end{bmatrix} = \begin{bmatrix} 0 \\ \alpha^{L_2-L_1}a_1 \\ \alpha^{L_3-L_1}a_1 + \alpha^{L_3-L_2}a_2 \\ \alpha^{L_4-L_1}a_1 + \alpha^{L_4-L_2}a_2 + \alpha^{L_4-L_3}a_3 \\ \ldots \\ \alpha^{L_N-L_1}a_1 + \alpha^{L_N-L_2}a_2 + \ldots + \alpha^{L_N-L_{n-1}}a_{N-1} \end{bmatrix}.$$

Again, the components of this equation provide a set of recursive equations in which $R_{j-1}$ defines $R_j$ for each component "j" of the vector equation. The recursive equations are:

$$R_1 = 0,$$
$$R_2 = \alpha^{L_2-L_1}(R_1 + a_1),$$
$$R_3 = \alpha^{L_3-L_2}(R_2 + a_2),$$
$$\vdots$$
$$R_N = \alpha^{L_N-L_{N-1}}(R_{N-1} + a_{N-1}).$$

From these equations, the entire set of $R_j$'s can be found recursively by performing of order N simple arithmetic operations analogously to the case of a disk with a single size for physical storage volumes. By replacing earlier equations for the vector object R with these equations, previously described processes 60, 70, 160, 180, and 230 for inter-disk and intra-disk swaps can be applied to disks having physical storage volumes of multiple sizes.

Other additions, subtractions, and modifications of the described embodiments may be apparent to one of ordinary skill in the art.

What is claimed is:

1. A process for performing an intra-disk swap, comprising:
   finding a set of values indicative of access loads of new states of a disk, each new state being produced from a current state of the disk by hypothetically swapping a pair of physical storage volumes of the disk;
   selecting one of the pairs of physical storage volumes based on the value of the access load of the new state produced by hypothetically swapping the selected one of the pairs; and
   performing a swap of the selected one of the pairs.

2. The process of claim 1, wherein each value is one of a seek time and a total access time.

3. The process of claim 2, wherein selecting one of the pairs comprises selecting the one of the pairs producing a new state with the lowest value of the set.

4. The process of claim 1, wherein each value is one of a seek time and a reduction to a seek time of the current state.

5. The process of claim 4, wherein the finding performs a number of arithmetic operations to obtain the set of values, the number being of order of a number of values in the set.

6. The process of claim 4, wherein the finding comprises:
   finding a set of numerical objects from activity data for the current state, the set having of order N members, the N being the number of storage volumes; and determining the one of a seek time and a reduction to a seek time of each new state by evaluating a formula based on the found set of numerical objects, the formula having less than of order N terms.

7. The process of claim 6, wherein the act of finding a set of numerical objects performs less than of order $N^2$ simple arithmetic operations.

8. The process of claim 1, wherein each act of finding a value includes performing a sum over component seek times to obtain a seek time for an associated one of the new states, each component seek time being a seek time associated with a reference head travel time function.

9. The process of claim 8, wherein each term of each sum is weighted by expansion coefficients of a head travel time function of the disk with respect to the reference travel time functions.

10. A process for determining seek times, comprising:
    collecting activity data on a current state of a disk;
    finding a plurality of numerical objects from the activity data; and then, determining a plurality of seek times for new states from the found numerical objects, each new state related to the current state by a hypothetical swap of a pair of storage volumes of the disk, the seek times corresponding to a preselected reference head travel time function.

11. The process of claim 10, wherein each act of determining a seek time includes performing a set of simple arithmetic operations less numerous than the physical storage volumes of the disk.

12. The process of claim 11, wherein the act of finding a plurality of numerical objects includes performing a set of simple arithmetic operations whose number is smaller than a square of the number of physical storage volumes on the disk.

13. The process of claim 10, wherein the reference head travel time function between a pair of the storage volumes is a weighted sum of numbers to powers of a distance between the pair.

14. A program storage media storing executable instructions for performing an intra-disk swap, the instructions to cause a computer to:
    find a set of values indicative of access loads of new states of a disk, each new state being produced from a current state of the disk by hypothetically swapping a pair of physical storage volumes of the disk; and
    select one of the pairs of physical storage volumes based on the value of the access load of the new state produced by hypothetically swapping the selected one of the pairs; and
    perform a swap of the selected one of the pairs.

15. The media of claim 14, wherein each value is one of a seek time and a total access time.

16. The media of claim 15, wherein the instruction to select comprises an instruction to the one of the pairs producing a new state with the lowest value of the set.

17. The media of claim 14, wherein each value is one of a seek time and a reduction to a seek time of the current state.

18. The media of claim 17, wherein the instruction to find causes the computer to perform a number of arithmetic operations to obtain the set of values, the number being of order of a number of values in the set.

19. The media of claim 17, wherein the instruction to find causes the computer to:
    find a set of numerical objects from activity data for the current state, the set having of order N members, the N being the number of storage volumes; and
    determine the one of a seek time and a reduction to a seek time of each new state by evaluating a formula based on the found set of numerical objects, the formula having less than of order N terms.

20. The media of claim 19, wherein the instruction to find a set of numerical objects includes less than of order $N^2$ simple arithmetic operations.

21. The media of claim 19, wherein the found set of numerical objects includes components of a vector Ta, the T being a matrix whose components are values of a head travel time function, and the a being a vector whose components are activities of the current state of the disk.

22. The media of claim 14, wherein the instruction to find a value causes the computer to perform a sum over component seek times to obtain a seek time for an associated one of the new states, each component seek time being a seek time associated with a reference head travel time function.

23. The media of claim 22, wherein each term of each sum is weighted by expansion coefficients of a head travel time function of the disk with respect to the reference travel time functions.

24. A program storage media storing executable instructions for a process that determines seek times, the instructions to cause a computer to:

collect activity data on a current state of a disk;

find a plurality of numerical objects from the activity data; and then, determine a plurality of seek times for new states from the found numerical objects, each new state related to the current state by a hypothetical swap of a pair of storage volumes of the disk, the seek times corresponding to a preselected reference head travel time function.

25. The media of claim 24, wherein each instruction to determine a seek time causes the computer to perform a set of simple arithmetic operations less numerous than the physical storage volumes of the disk.

26. The media of claim 25, wherein the instruction to find a plurality of numerical objects causes the computer to perform a set of simple arithmetic operations whose number is smaller than a square of the number of physical storage volumes on the disk.

27. The media of claim 24, wherein the reference head travel time function is a Fourier basis function.

28. The media of claim 24, wherein the reference head travel time function between a pair of the storage volumes is a weighted sum of numbers to powers of a distance between the pair.

29. A system for performing an intra-disk swap, comprising:

means for finding a set of values indicative of access loads of new states of a disk, each new state being produced from a current state of the disk by hypothetically swapping a pair of physical storage volumes of the disk.

30. The system of claim 29, further comprising:

means for selecting one of the pairs of physical storage volumes based on the value of the access load of the new state produced by hypothetically swapping the selected one of the pairs; and means for performing a swap of the selected one of the pairs.

31. The system of claim 29, wherein each value is one of a seek time and a total access time.

32. The system of claim 31, wherein the means for finding performs a number of arithmetic operations to obtain the set of values, the number being of order of a number of values in the set.

* * * * *